United States Patent [19]

Warburton et al.

[11] Patent Number: 5,099,920

[45] Date of Patent: Mar. 31, 1992

[54] SMALL DIAMETER DUAL PUMP POLLUTANT RECOVERY SYSTEM

[76] Inventors: James G. Warburton, 13 Washington La., Chadds Ford, Pa. 19317; John F. Hurst, 8 Fair Valley Ct., Newark, Del. 19711

[21] Appl. No.: 539,997

[22] Filed: Jun. 18, 1990

Related U.S. Application Data

[63] Continuation of Ser. No. 166,454, Mar. 10, 1988, Pat. No. 4,934,458.

[51] Int. Cl.$^5$ .............. E21B 43/00; E21B 43/12; F04B 49/04; F04B 49/06
[52] U.S. Cl. .............. 166/250; 166/53; 166/64; 166/66; 166/66.4; 166/68; 166/370; 73/311
[58] Field of Search ............. 166/53, 54, 64, 65.1, 166/66.5, 68, 66, 369, 250, 370, 66.4, 54.1; 73/311, 313, 314, 290 R, 304 R, 304 C; 200/84 C, 84 R; 417/2, 40, 41; 318/482; 340/624, 618

[56] References Cited

U.S. PATENT DOCUMENTS

| | | | |
|---|---|---|---|
| 1,779,353 | 10/1930 | Becker | 73/311 |
| 1,978,392 | 10/1934 | Brockdorff | 73/311 X |
| 2,510,663 | 6/1950 | Schuessler | 73/311 |
| 2,536,273 | 1/1951 | Gahagan | 200/84 C |
| 3,285,183 | 11/1966 | Hembree et al. | 200/84 C |
| 3,419,695 | 12/1968 | Dinkelkamp et al. | 200/84 C |
| 3,915,225 | 10/1975 | Swink | 166/53 |
| 4,273,650 | 6/1981 | Solomon | 210/104 |
| 4,342,224 | 8/1982 | Hava et al. | 73/313 |
| 4,404,093 | 9/1983 | Moyer | 210/138 |
| 4,469,170 | 2/1985 | Farmer | 166/53 |
| 4,497,170 | 2/1985 | Breslin | 166/372 |
| 4,527,633 | 7/1985 | McLaughlin et al. | 166/370 |
| 4,546,830 | 10/1985 | McLaughlin et al. | 166/370 |
| 4,625,801 | 12/1986 | McLaughlin et al. | 166/267 |
| 4,625,807 | 12/1986 | Harlow | 166/370 |
| 4,747,451 | 5/1988 | Adams, Jr. et al. | 166/53 |

*Primary Examiner*—Stephen J. Novosad
*Attorney, Agent, or Firm*—Laurence Weinberger

[57] ABSTRACT

A groundwater pollutant recovery system using the cone of depression approach, in which a sensing probe having liquid level sensors responsive to both water and pollutant levels and having attached to it the pollutant intake is deployed in a recovery well above the submerged water and pollutant pumps. The pollutant intake on the sensing probe is attached to the pollutant pump by an extendable hose so that the sensing probe may be raised and lowered in response to changing hydraulic conditions in the well, without the necessity of changing the water or pollutant pump positions. The recovery sequence is controlled by a microprocessor under the control of a program responsive to the liquid levels indicated by the sensors in the sensing probe.

20 Claims, 14 Drawing Sheets

SMALL DIAMETER DUAL PUMP POLLUTANT RECOVERY SYSTEM

This application is a continuation of co-pending allowed application Ser. No. 07/166,454 filed on Mar. 10, 1988, and now U.S. Pat. No. 4,934,458.

BACKGROUND OF INVENTION

1. Field of Invention

This invention relates to the removal and recovery of liquid pollutants which have contaminated the groundwater aquifer, and in particular, to those pollutants which are substantially immiscible with water and rest upon and travel with the groundwater.

2. Description of Related Art

During the past decade, one of the major environmental concerns has been the detection and removal of pollutants which threaten the underground water supply of the United States. Of particular concern has been the pollution by organic compounds such as chlorinated hydrocarbons and petroleum derivatives. Hydrocarbon pollution, in particular, has been acute where gasoline storage tanks and transmission lines have leaked or ruptured at refining facilities, distribution sites, or along the length of the transmission lines. As the leaking hydrocarbons disperse into the ground, a plume is formed, narrow at the top and spreading out until it contacts the water table. The actual shape of the plume will depend on the porosity of the soil in various directions as well as the horizontal flow of the water table. Once the hydrocarbon has reached the water table, it is free to move with the underground water.

Removal techniques have utilized the fact that the pollutants frequently have a lower density than water and therefore ride on the top of the water table. Two approaches have been taken to recovering the pollutants from the groundwater both utilizing wells with perforated casings which are constructed so as to intercept the groundwater. In the first approach, passive accumulators are placed in the well at the pollutant/water interface. These devices collect a volume of pollutant and then discharge it above ground. Examples are the collection chamber of Swink, U.S. Pat. No. 3,915,225; the automatic skimmer of Moyer, U.S. Pat. No. 4,404,093; and the semipermeable membrane collector of Breslin, U.S. Pat. No. 4,497,370. These devices are passive in the sense that they intercept only the pollutants which flow through the well as a consequence of normal underground water movement.

In the second approach, an attempt is made to intercept a higher proportion of the pollutant by drawing the pollutant to the well site using the groundwater itself. In this technique, water is pumped from the well at a rate sufficient to depress the water level in the well below its natural level. As a consequence of this water level depression, water from the surrounding area, under the influence of gravitational hydrostatic pressure, flows towards the well trying to reestablish the original level. As the water flows towards the well, it carries upon it the lower density pollutant. A so called 'cone of depression' is formed with the well at its apex. The theory behind and the hydraulics of such a cone of depression have been described in detail by Fletcher G. Driscoll in Groundwater and Wells, (Second Edition 1986, Johnson Division, St. Paul, Minn.) In cross section, both the level of the water table and the pollutants riding upon it are lowest in the well. In this manner, the well intercepts a larger volume of pollutant. Examples of this approach are Solomon, U.S. Pat. No. 4,273,650; Farmer, U.S. Pat. No. 4,469,170; McLaughlin et al., U.S. Pat. Nos. 4,527,633, 4,546,830, and 4,625,801; and Harlow, U.S. Pat. No. 4,625,807.

Even in the prior art approaches using the cone of depression technique, the pollutant is first accumulated in a fixed volume reservoir, which is then purged and allowed to refill. The overall rate of pollutant removal is, therefore, dependant on the reservoir size as well as the reservoir discharge and refill times. In the present system this limitation is overcome by continuous pumping and removal of the pollutant as long as the pollutant intake remains in the pollutant layer.

In Solomon and Farmer, the pollutant is removed by an electrically driven pump, while in McLaughlin et al. and Harlow the pollutant is removed by compressed gas. In these cases, the presence and filled level of the pollutant in the reservoir is registered by various appropriate sensors. Solomon and Swink placed both the reservoir and electric pump at the pollutant/water interface. McLaughlin et al. and Harlow believed that having an electrically driven pump in proximity to potentially explosive pollutants at the pollutant/water interface was an unecessary risk and, therefore, designed their systems to use compressed air to remove the pollutant. In the present system the advantage of an electrically driven pollutant pump is retained while the pump is located away from the water/pollutant interface submerged below the surface of the water.

In both the passive and cone of depression approach, one of the major problems is positioning the pollutant receiving unit so that it remains in the pollutant/water interface. The interface position in both approaches is constantly changing since the water table is not static. Its position will depend on the porosity of the soil, groundwater flow rates, and the groundwater recharge rate which is principally a function of rainfall. Frequent observation and readjustment of the reservoir units is, therefore, necessary. To help avoid this problem, Farmer designed a floating skimmer reservoir which moves with the interface. However, a penalty is paid in Farmer's approach in the requirement for a larger diameter well and multiple suspension systems for the water pump, skimmer, and pollutant pump.

In addition, significant changes in the depth of the water table due to rising and falling water levels disturb the flow of pollutant into the well by forcing the pollutant back and forth into the soil matrix. For this reason, the best way to effect pollutant removal is to establish and hold a cone of depression within as short a vertical range as possible wherein a flow of pollutant out of the soil matrix is established and maintained. The present invention provides a sensor and control system which minimizes as much as possible variations in water table depth. When the hydraulics of a given well system exceed the ability of the water pump to hold the depressed level at a given depth, the design of the present invention permits a rapid and easy repositioning of the sensing probe and, thereby, the cone of depression so that the control system responds to the new conditions.

Further, all of the disclosed cone of depression technique devices require at least two separate suspension systems, one for the water pump and one for the pollutant recovery reservoir. McLaughlin et al. suggest but do not show a single suspension system. In addition to the multiple suspension systems, either multiple air hoses or electric lines, all of which are subject to abrasion and stretch, are required by the prior art systems. The present system avoids the problems of flexible suspension systems by using a rigid riser tube to suspend the pumps. The riser tube also protects the power cable from unnecessary abrasion as well as satisfying the National Electrical Code requirements.

Because of the physical size and number of units and suspension systems which must be employed, many of the prior art systems require wells which can range up to 24 inches in diameter. Wells of this size are time consuming and expensive to construct. On the other hand, wells of approximately 4 inches in diameter are relatively easy and inexpensive to construct. Typically, in the past, smaller wells of this size were constructed surrounding the larger recovery well for observation purposes. The present system and its components are designed to utilize the smaller diameter wells.

BRIEF SUMMARY OF INVENTION

A novel method, apparatus, software, and overall system are provided to permit removal of immiscible pollutants from the groundwater using the cone of depression method in small diameter wells. According to the invention, both a water pump assembly and a pollutant pump assembly are mounted at the lower end of a hollow, rigid pipe which serves not only to suspend the pumps in the well, but also as the exhaust conduit for the pumped water to the surface. Using pipe to both suspend the pumps and convey the discharge water eliminates the need for either extra cable suspension apparatus or for long lengths of flexible tubing which frequently stretches, twists, and binds under the combined weight of tubing and pumps.

The pumps are located approximately fifteen (15) to twenty (20) feet below the anticipated level of the apex of the cone of depression. The electrically operated pollutant pump motor is, therefore, not located near any potentially volatile compounds at the water/pollutant interface. A single power cable containing multiple conductors is run on the inside of the riser pipe to the surface. A novel single sensing probe containing density floats for both water and pollutant is attached to a movable collar glide which may be positioned at variable distances above the pollutant pump casing. The instrumentation cable leading to the sensing probe can be used to raise and lower the probe. Attached to the probe at the height of the internal pollutant sensing float is the pollutant inlet. Pollutant is continuously removed from the pollutant layer by the pollutant pump as long as the pollutant intake remains in the pollutant layer. This pollutant inlet is connected to the pollutant pump inlet by means of a coiled extendable hose which encircles the riser pipe. A pollutant discharge hose runs from the pollutant pump discharge outlet to an above ground receiving vessel. In the riser pipe at the surface beyond the point where the power cable is led out, is located a flow sensor followed by a restriction valve which permits adjustment of the water flow rate from the well.

All signals from the sensing probe are carried to the control box wherein a preprogrammed microprocessor responds to the conditions indicated by the sensing probe and controls the power to the pollutant and water pump motors in accordance with the desired recovery scheme. A particularly novel feature of the invention is that the sensing probe may be easily raised and lowered in the well to cause the water pump to reposition the pollutant/water interface, and, in conjunction with the controller, can quickly be adapted to changing conditions in the well. The system therefore achieves through use of the sensing probe and specialized programmed controller a high degree of efficiency of pollutant removal from the groudwater using only a small diameter well.

It is one object of the present invention to recover lower density immiscible pollutants from the surface of the underground water table using the cone of depression method in small diameter wells with a single suspension, central axis mounted, dual pump system. It is a further object of the present invention to use a single unique probe assembly, having sensors for both water and pollutant levels, in conjunction with a programmed microprocessor based central control system to control both water pump motor and pollutant pump motor operation during the removal process. Finally, it is the object of the present invention to provide a method of quickly and conveniently relocating the pollutant intake and resetting the height of the cone of depression when naturally changing conditions vary the height of the pollutant/water interface.

DETAILED DESCRIPTION OF THE INVENTION AND PREFERRED EMBODIMENTS

Figure 1:
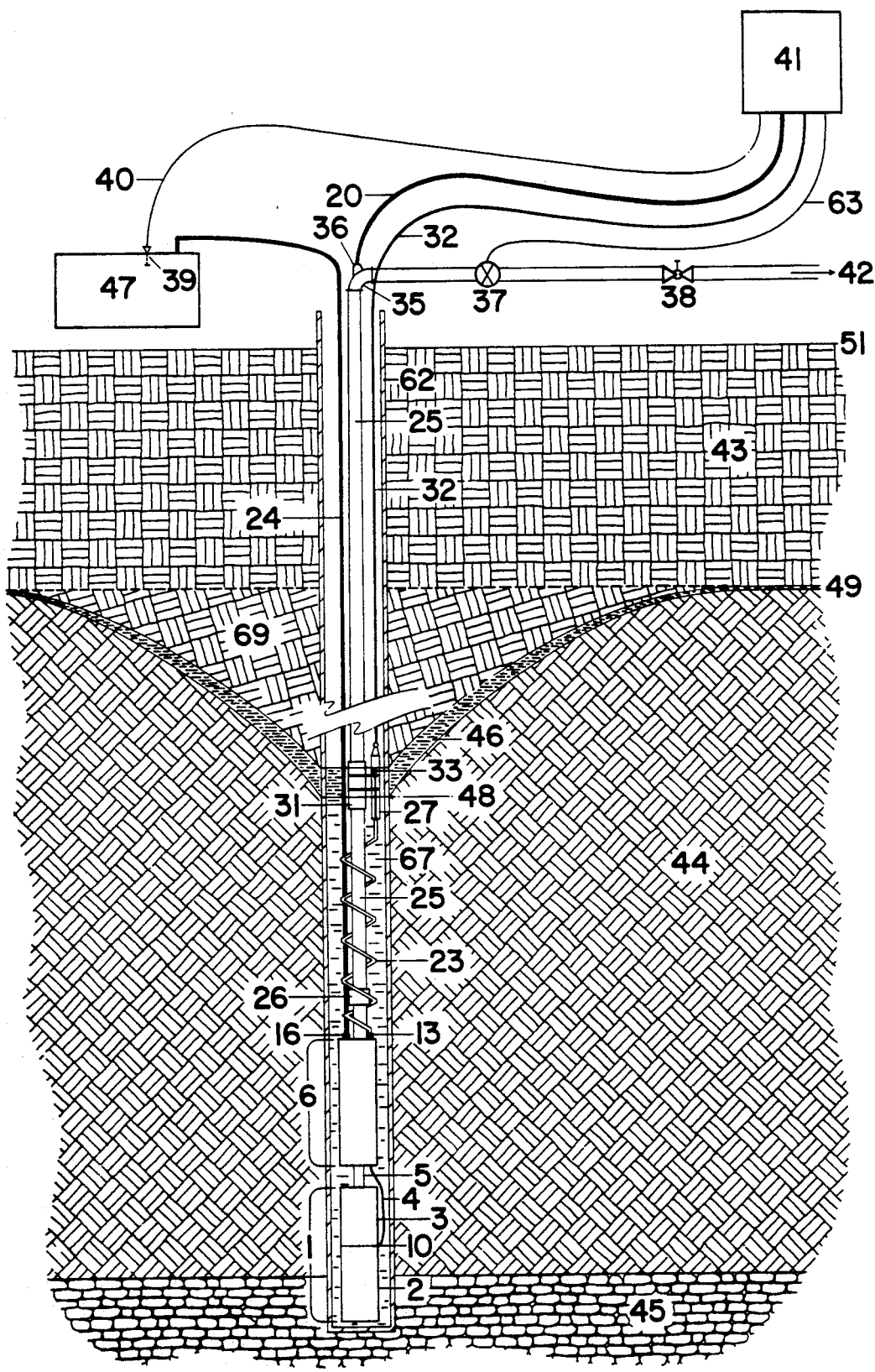
FIG. 1 is a diagramatic cross sectional view of a well which penetrates through and into the water table under a pollutant site in which are located the dual pumps and motors suspended by the riser pipe and the single probe mounted on its glide located above the pumps.

In FIG. 1, a small diameter well pipe 62 of approximately 4 inches diameter and having a slotted screen sidewall is shown extending from the earth's surface 51 down through pollutant bearing soil 43 into the aquifier 44 and bedrock 45. The top of the normal non-disturbed level of the groundwater table is indicated at 49. In the figure, the water table level has been reduced by action of the water pump 3 to create a cone of depression of the water to level 48 with the well at the apex of the cone. A cone of dewatered aquifer 69 remains above the cone of depression of the water table. The immiscible pollutant 46 of lower density than water is shown riding atop the water and has taken on the depressed cone shape of the water. Below the top of the depressed water level 48 the well is shown filled with water 67. The depressed level may exceed several feet vertically thereby forming a cone several tens to hundreds of feet laterally.

Water pump motor 2 is shown joined to water pump 3 in the water pump and motor assembly 1. The water pump and motor assembly 1 is rigidly connected to the pollutant pump and motor assembly 6 by a short section of pipe 5 which is integrally connected to the pollutant pump and motor assembly and which also serves to deliver the exhaust water from the water pump 3 into the pollutant pump and motor assembly 6 where it flows around the casing surrounding the pollutant pump motor and pollutant pump before exiting the top of the pollutant pump and motor assembly 6 into riser pipe 25 to which the pollutant pump and motor assembly 6 is joined. The riser pipe 25, which is made up of sections joined by couplings 26, suspends the pollutant pump and motor assembly 6 and the water pump and motor assembly 1 in the well. The electrical supply cable 20 for the pump motors runs down the inside of the riser pipe 25 to the top of pollutant pump and motor assembly 6. The electrical power supply cable 4 for the water pump motor 2 runs from the bottom of pollutant pump and motor assembly 6 to the electrical motor connection of the water pump motor at 10.

Shown above the pollutant pump and motor assembly 6 is the sensing probe 27 attached to probe glide 31 and having attached to the side of probe 27 the pollutant intake assembly 33. The probe 27 is shown with the pollutant intake assembly 33 immersed in pollutant layer 46. The pollutant intake assembly 33 is connected to pollutant pump intake 13 by an extendable intake assembly hose 23 which is shown encircling riser pipe 25. Pollutant discharge conduit 24 is attached to the pollutant pump discharge 16 and runs up the outside of the riser pipe 25 out of the well to a pollutant recovery tank 47. The pollutant discharge line 24 has a one way flow check valve (not shown) inserted to prevent backflow to the pollutant pump. The sensing probe 27 is suspended by instrument cable 32 which carries the signals from the sensing probe to the control unit 41 containing the microprocessor.

At the top of riser pipe 25 is a pipe tee 35 through which the power cable 20 for the pump motors is removed from the riser pipe through a liquidtight fitting 36 and then connected to control unit 41. The side arm from pipe tee 35 directs the water discharge from water pump 3 past a flow sensor 37 and then through a variable flow reducing means 38 to eventual discharge at 42. The signal output cable 63 from the flow sensor is connected to control unit 41. In the recovery tank 47 is located a float sensor 39 which is connected to the control unit 41 by cable 40.

Figure 2:
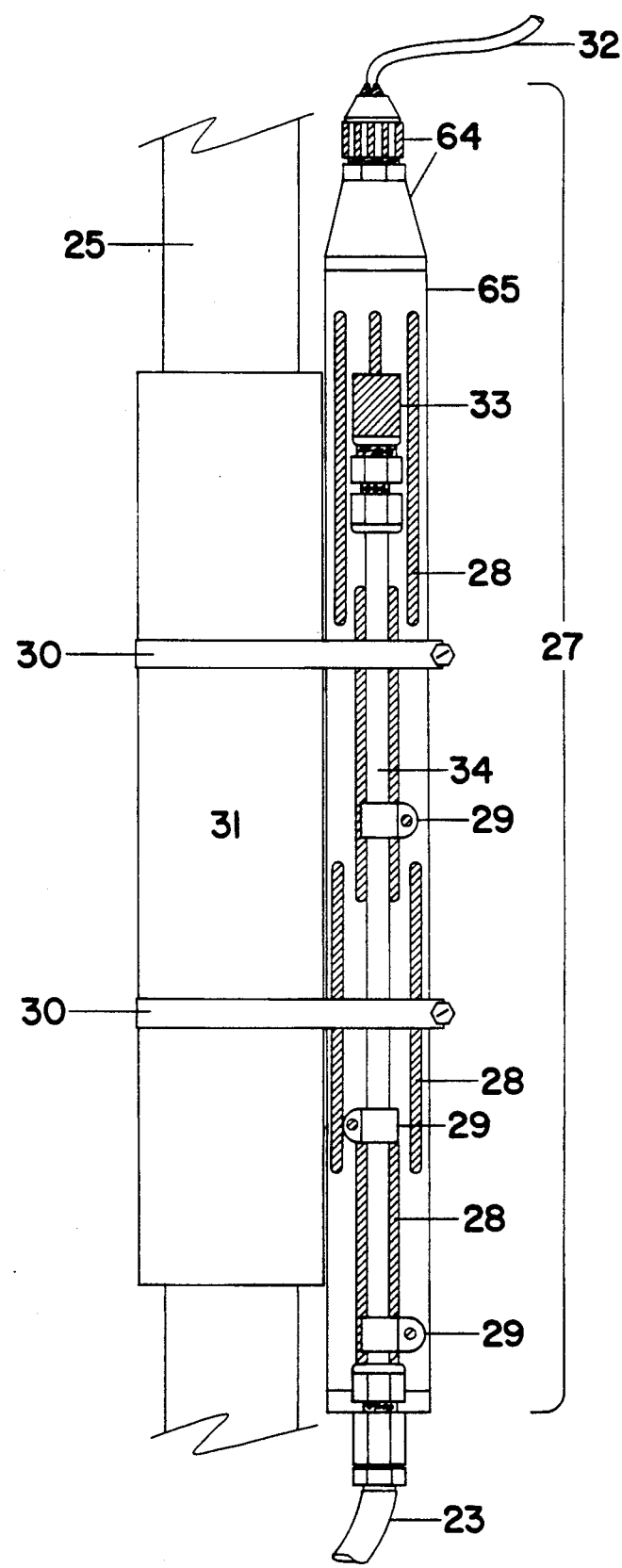
FIG. 2 is a side view of the exterior of the sensing probe with the pollutant intake attached. The probe is shown attached to the sliding glide.

FIG. 2 shows an external view of the sensing probe 27 which is an elongated hollow cylinder containing the sensing floats. In use, the sensing probe is mounted with its longer axis oriented vertically in the recovery well. The sensing probe 27 is shown attached to probe glide 31 by attaching straps 30. Shown penetrating the side of the outer hollow shell 65 of the probe 27 are multiple apertures or slots 28 distributed around the outside of the cylindrical shell through which water and pollutant are free to flow into and out of the interior space of the hollow probe shell. In the preferred embodiment the vertical dimensions of the apertures overlap as shown along the height of the probe cylinder so that pollutant can always enter the hollow probe shell and reach the pollutant float no matter what the height of the water/pollutant interface. Pollutant intake assembly 33 is attached to intake tube 34. The intake tube 34 is attached to the side of probe 27 by brackets 29. Pollutant intake tube 34 is shown attached to the expandable intake hose 23. The outer hollow probe shell 65 is constructed from non-magnetic material.

Figure 3:
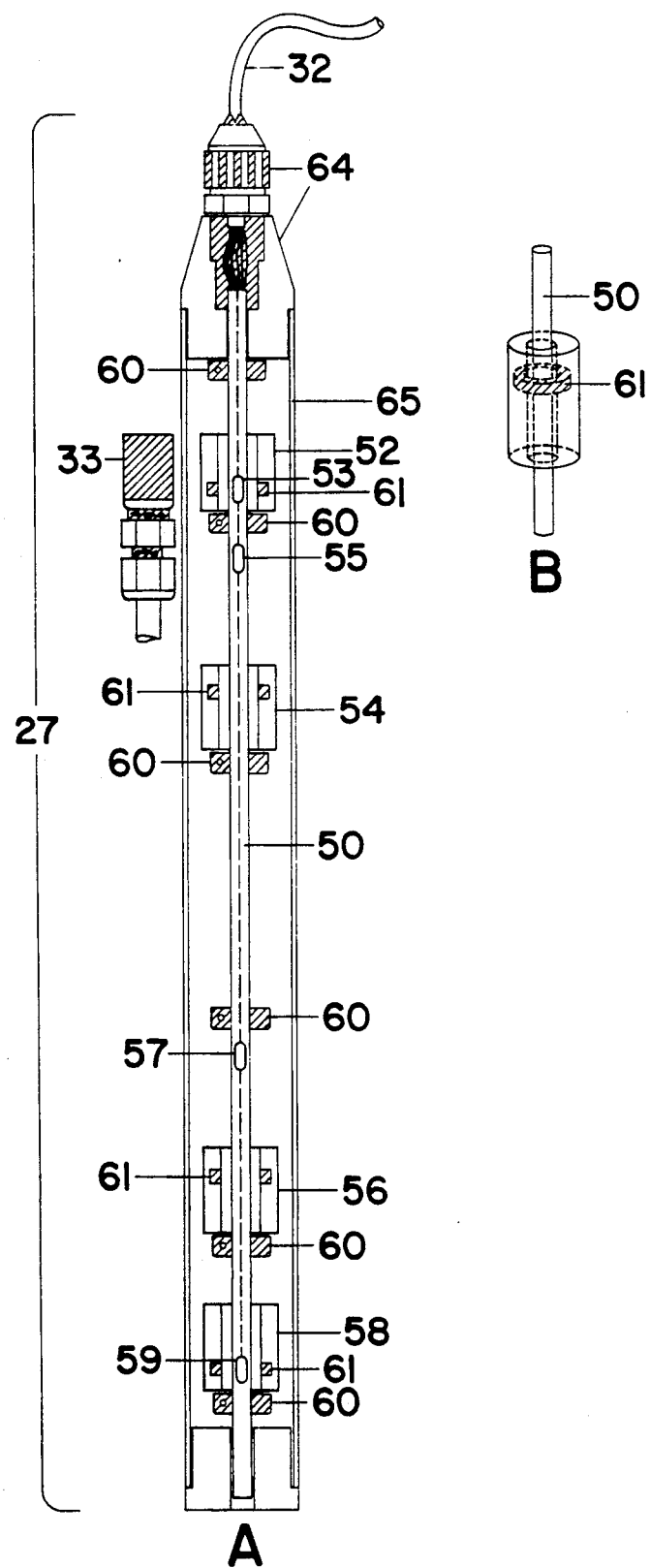
FIG. 3(a) is a cross sectional view of the sensing probe showing the arrangement of density floats, magnetic switches, and pollutant intake.
FIG. 3(b) is an oblique view of a density float showing the annular magnet within.

FIG. 3(a) is a cross sectional view of the sensing probe which shows the internal floats, magnets, and switches forming the liquid level sensors within the hollow cylindrical shell 65 of probe 27. Down the center and coaxial with the longer axis of hollow probe shell 65 runs a smaller diameter hollow cylindrical shaft 50 made of non-magnetic material. At four positions upon the shaft 50 are located cylindrical floats 52,54,56 and 58 which contain cylindrical disk magnets 61 imbedded within them. Centrally located apertures within the floats coaxial with the longer axis of the floats and of a diameter greater than the central shaft 50 of the probe allow movement of the floats along the long axis of the central shaft. In the preferred embodiment, the ends of the cylindrical floats are not flat but are rounded or bullet shaped so that any debris is pushed aside as the floats move up an down and debris does not accumulate on flat ends. Also in the preferred embodiment, the non-magnetic material from which the probe is constructed is stainless steel.

Within the central shaft 50 are located four small hermetically sealed magnetic switches 53,55,57 and 59. The liquid level sensors are made up of float and switch combinations 52 and 53, 54 and 55, 56 and 57, and 58 and 59. The floats 54, 56, and 58 along with their contained magnets have a density slightly less than that of water. For purposes of this specification float-switch combination 58-59 will be referred to as the override sensor, combination 56-57 as the low water sensor, and combination 54-55 as the high water sensor. Float 52 along with its contained magnet has a density significantly less than the pollutant being recovered by the system. For purposes of this specification float switch combination 52-53 will be referred to as the pollutant sensor. Pollutant intake assembly 33 is located adjacent to (or in the vertical orientaton in the well, at the same height as) the lowest pollutant float 52 position where the pollutant float magnet surrounds and activates switch 53. The close proximity of the pollutant intake to the water high level switch position allows continuous pumping of pollutant up until the time that water actually nears the pollutant intake.

The switches 53, 55, 57, and 59 are magnetically activated by the magnets contained in the floats when the floats move upon the central shaft so that the magnets within the floats surround the switches. The wire leads from the switches are connected to control unit 41 through instrumentation cable 32 which exits probe 27 through liquidtight fitting cap 64. When the probe 27 is installed with its longer axis oriented vertically in the recovery well, the floats are free to move vertically upon vertical central shaft 50 within the vertical ranges set by limiters 60. The limiters separate each float-switch sensor combination and prevent a float from activating the wrong magnetic switch. In the preferred embodiment switch 59 is located at the lower end of the movement range of the override float set by the override float lower limiter, switch 57 is located at the upper end of the movement range of the low water float set by the low water float upper limiter, switch 55 is located at the upper end of the movement range of the high water float set by the high water float upper limiter, and switch 53 is located at the lower end of the movement range of the pollutant float set by the pollutant float lower limiter. In the preferred embodiment, switches 55, 57, and 59 are normally open, while switch 53 is normally closed.

FIG. 3(b) is an oblique view which shows one of the cylindrical magnets 61 located in a typical float surrounding the central shaft 50. It should be understood, that, while the preferred embodiment utilizes switches activated by magnets contained in floats responsive to the difference in density between water and pollutant, the liquid level sensing means may be of other types such as electical or thermal conductivity, resistive, or capacitive without limiting the scope of the invention.

Figure 4:
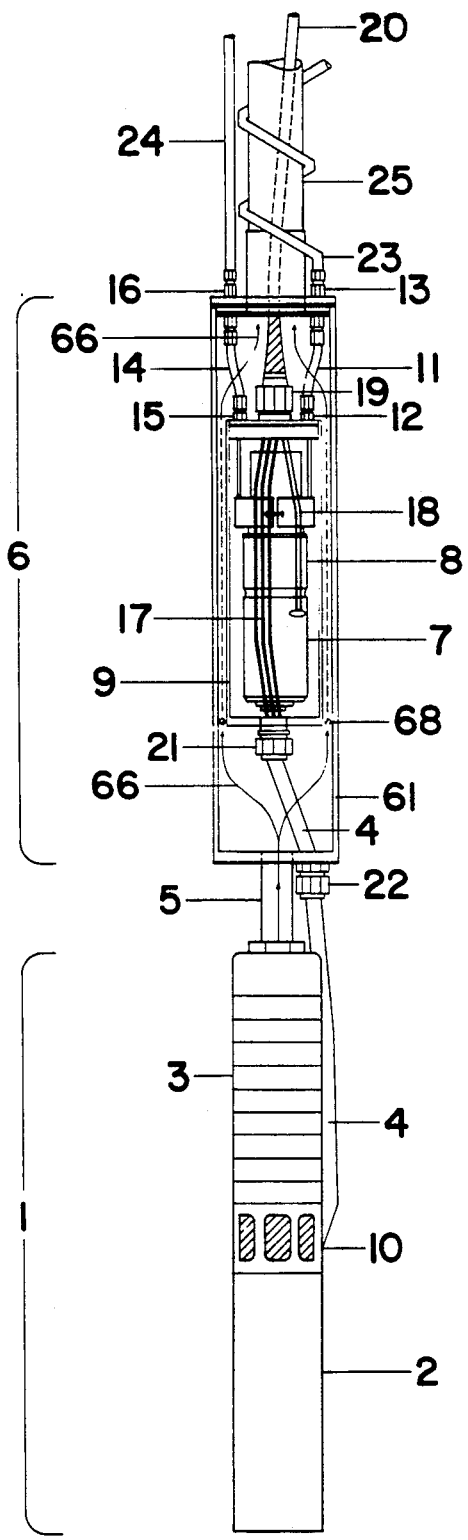
FIG. 4 is a cross sectional view of the pollutant pump and motor housing which is attached to the water pump.

FIG. 4 shows a cross sectional view of the pollutant pump and motor assembly 6 connected by pipe 5 to water pump and motor assembly 1. The water pump and water pump motor as well as the pollutant pump and pollutant pump motor are standard types readily available commercially. The pollutant pump and motor assembly 6 is composed of an outer casing 61 enclosing an inner pollutant pump and motor casing 9. Within the inner pollutant pump and motor casing 9 is the pollutant pump motor 7 which drives pollutant pump 8. Pollutant pump and motor casing 9 is separated from and mounted coaxially with external casing 61 by spacers 68 so that the discharge water from water pump 3 flows freely around casing 9 and up and out through riser pipe 25 as indicated by arrows 66. The flow of discharge water serves to cool pollutant pump casing 9, pollutant pump 8, and pollutant pump motor 7. The cooling prevents overheating of the pollutant pump and motor giving a longer service life. Pollutant intake hose 23 connects to pollutant intake coupling 13 which leads through casing 61 to pollutant pump inlet tube 11. Tube 11 connects to intake coupling 12 which leads through casing 9 to the pollutant pump inlet. Pollutant discharge conduit 24 connects to discharge coupling 16 which leads through casing 61 to pollutant pump discharge tube 14. Tube 14 connects to discharge coupling 15 which leads through casing 9 to the pollutant pump discharge. Electrical power cable 20 runs down the inside of the riser pipe 25 directly to the pollutant pump and motor casing 9 where it passes into casing 9 through liquidtight seal 19. The power conductors 18 for the pollutant pump motor are split out from cable 20 inside casing 9. Power for the water pump motor 2 is supplied by the remaining conductors 17 from cable 20 which are led out as cable 4 from inside the pollutant pump and motor casing 9 through liquidtight connector 21 then through the pollutant pump and motor assembly outer casing wall 61 through liquidtight connector 22 to the water pump motor 2 where it enters through a liquidtight fitting at 10.

Figure 7:
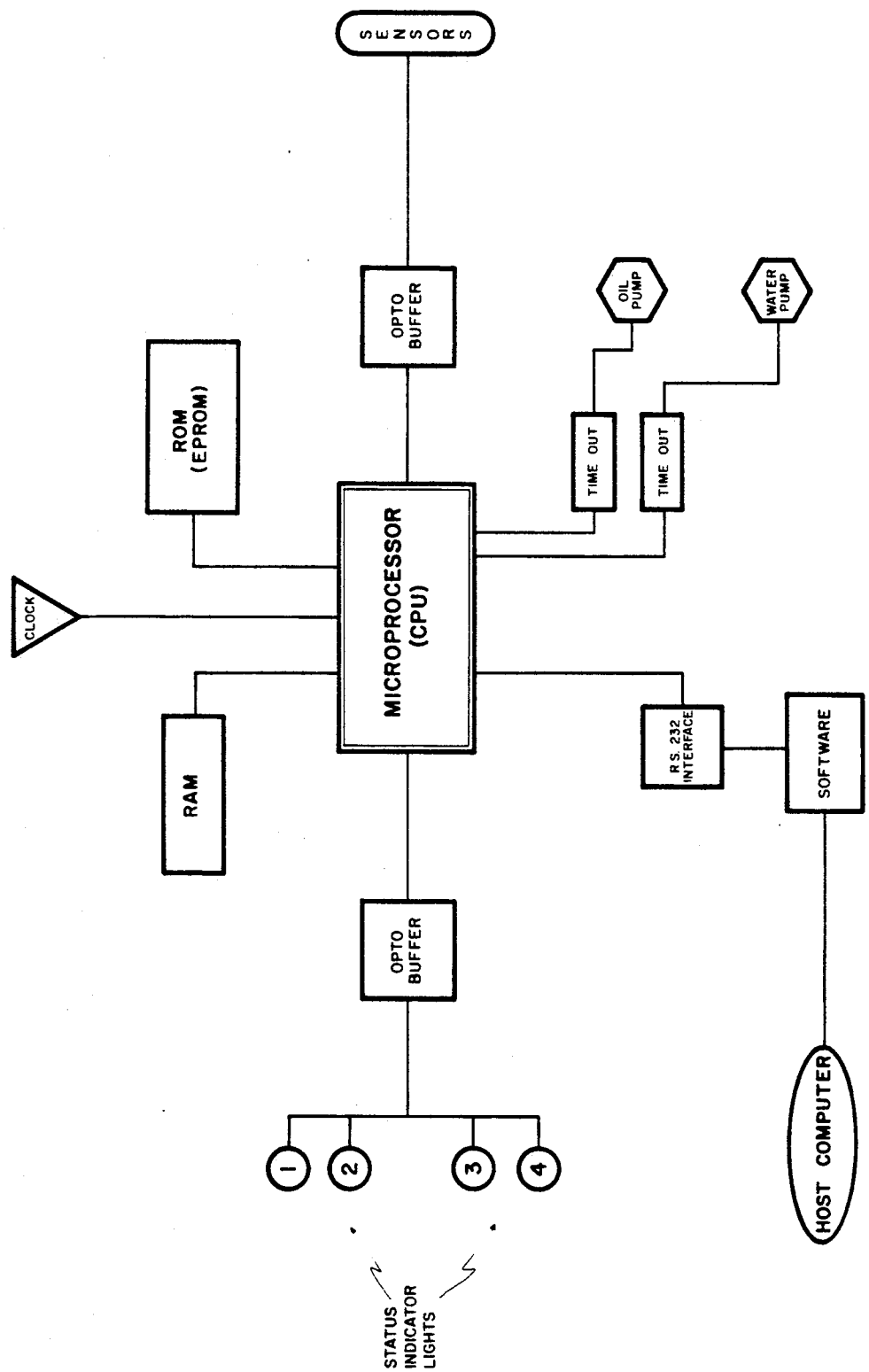
FIG. 7 is a block diagram showing the functional interrelationships of the electronic components of the microprocessor based control unit.

FIG. 7 diagramatically outlines the functional interrelationships of the electrical and electronic components of the control unit of the invention. The system control unit consists of a computer under the control of a unique software program developed to implement the recovery of pollutant by the present invention with the pumps and probe described. The microprocessor based CPU is of a kind well known in the prior art and is appropriately connected by standard means to the clock, RAM, ROM, sensor inputs, time delay inputs, pump power outputs, status light outputs, and serial interface. The sensors include both the water and pollutant float sensors in the sensing probe and the overflow float in the pollutant recovery tank.

All control signals from the sensors are electrically isolated from the microprocessor by optical isolation buffers to avoid any stray (non-intrinsically safe) currents being conducted into the instrumentaion cables which might cause an explosion hazard in the well or the recovery tank. An optical isolation buffer also isolates the status indicator lights which may be located either on the control unit control panel or on a remote status unit. Once again, the optical isolation buffers prevent any stray (non-intrinsically safe) currents being conducted into the system. The microprocessor also switches power to the pump motors through solid state optically isolated relays. In addition, optional time delays may be introduced into the pump motor activation routines by the setting of switches on the control panel.

When power is supplied to the CPU, it automatically begins to control the pump motors under the command of the software program of the invention resident in the ROM in response to data input from the sensors. The entire performance and status of the system may be monitored and altered by a remote computer through a serial RS232 interface to the microprocessor. Because they do not interact with the control system program, several control panel gauges are not illustrated. Not shown in the diagram is the flow meter output which is mounted on the control panel of the system controller. The flow meter is used to judge the volume and set the correct water pump discharge rate to help maintain the proper cone of depression. Also not shown is the instrumentation mounted on the system control panel used to indicate whether the pump motors are actually drawing power.

There is also mounted on the system control panel an enabling switch, which is monitored by the control program, which tells the controller to ignore the status of the water low level sensor and control the power to the water pump on a timed routine basis. This switch and alternative sequence is provided to allow flexibility in responding to the changing well hydralics.

Not shown in FIG. 7 are the standard power supply connections to the control unit for powering the CPU and those components connected to it. However, in the main power lead to the microprocessor is a normally closed panel mounted momentary push button switch. When the program shuts down power to the water pump motor in response to lowering of the override float, human intervention is necessary to restart the water pump. Restart is achieved by momentarily cutting off power to the microprocessor with the push button switch. Upon releasing the switch, power is restored to the microprocessor which once again automatically initiates the software program.

FIGS. 8, 9, 10, 11, 12, 13, and 14 show the complete flowchart diagram for the software program depicting the recovery technique of the present invention. The program receives data from the liquid level sensors and, by appropriately directing the computer to switch power to the water and pollutant pump motors, implements the recovery system of this invention. The program elements interconnect at the indicated points on each diagram. In addition to monitoring the sensors and controlling the power to the pump motors, the program activates status indicator lights and monitors and responds to control panel switch conditions. At the end of this specification is a written description of the program.

The operation of the pumps, probe, and control unit will now be described with particular attention to the control sequence activated by the liquid level sensors. In practice, the connected pump and motor assemblies, with the sensing probe resting above the fully retracted and coiled inlet hose on top of the pollutant pump and motor assembly, are lowered into the well by adding additional sections of riser pipe until the top of the pollutant pump and motor assembly is approximately fifteen to twenty feet below the anticipated position of the bottom of the cone of depression of the water level. The riser pipe is secured and the power, instrumentation, water flow sensor, and pollutant recovery tank overflow sensor cables are attached to the control unit. Similarly, the appropriate liquid discharge connections are established. The sensing probe assembly is raised by the instrumentaton cable some distance above the pollutant pump and motor housing to a predetermined position where the lower apex of the cone of depression is desired. The system is then powered up.

Both the water and pollutant pump motors run at a constant rate. The rate of discharge of water from the well necessary to maintain the cone of depression can be varied only by changing the pump capacity, cycling the pump on and off, or by restricting the water exhaust by means of the valve 38. Ideally, the water pump would be on continuously and the valve adjusted to produce a flow rate exactly sufficient to hold the cone of depression to a set level. In actual practice, a rough approximation to the correct (ideal) flow rate is made by an initial selection of water pump capacity and by on-site adjustment of the restrictive valve means using information from the flow sensor to make appropriate adjustments.

However, flow of water into the well varies widely with changing hydraulic conditions, and it is therefore necessary for the system to respond to the constantly changing conditions so that the cone of depression is maintained as well as possible and, at the same time, no water is drawn into the pollutant pump. As indicated above, the present invention achieves this goal by placing the pumps under the control of a microprocessor and software program which respond to the information provided by the liquid level sensors. The inherent response time of the system may be changed by lengthening the sensing probe and increasing the distance separating the low water and high water sensors. As the vertical distance between sensors is increased, the rising water carrying the pollutant layer will take a correspondingly longer time to reach and raise each successive float. Similarly, the time between successive floats being lowered is increased. Generally, in wells which have a high recharge rate, a large water pump and longer sensing probe are needed to avoid excessively frequent water pump cycles. The following combinations have been found most effective to give a better chance of being able to adjust the flow rate of the system to that which is needed to keep the water pump working almost constantly thus minimizing the switching of the water pump motor on and off: with pumps having capacities up to 15 gallons per minute, 15 inch probes; with pumps having capacities from 16 to 30 gallons per minute, 24 inch probes; with pumps having capacities above 30 gallons per minute, 36 inch probes.

Since the operation of the control program in response to the positions of the liquid level sensors will be the same whether the probe is initially lowered into a full well or if the well liquid levels cycle under the influence of the pumps, the description of the operation of the control system will be described considering both rising and falling pollutant and water levels.

Figure 5:
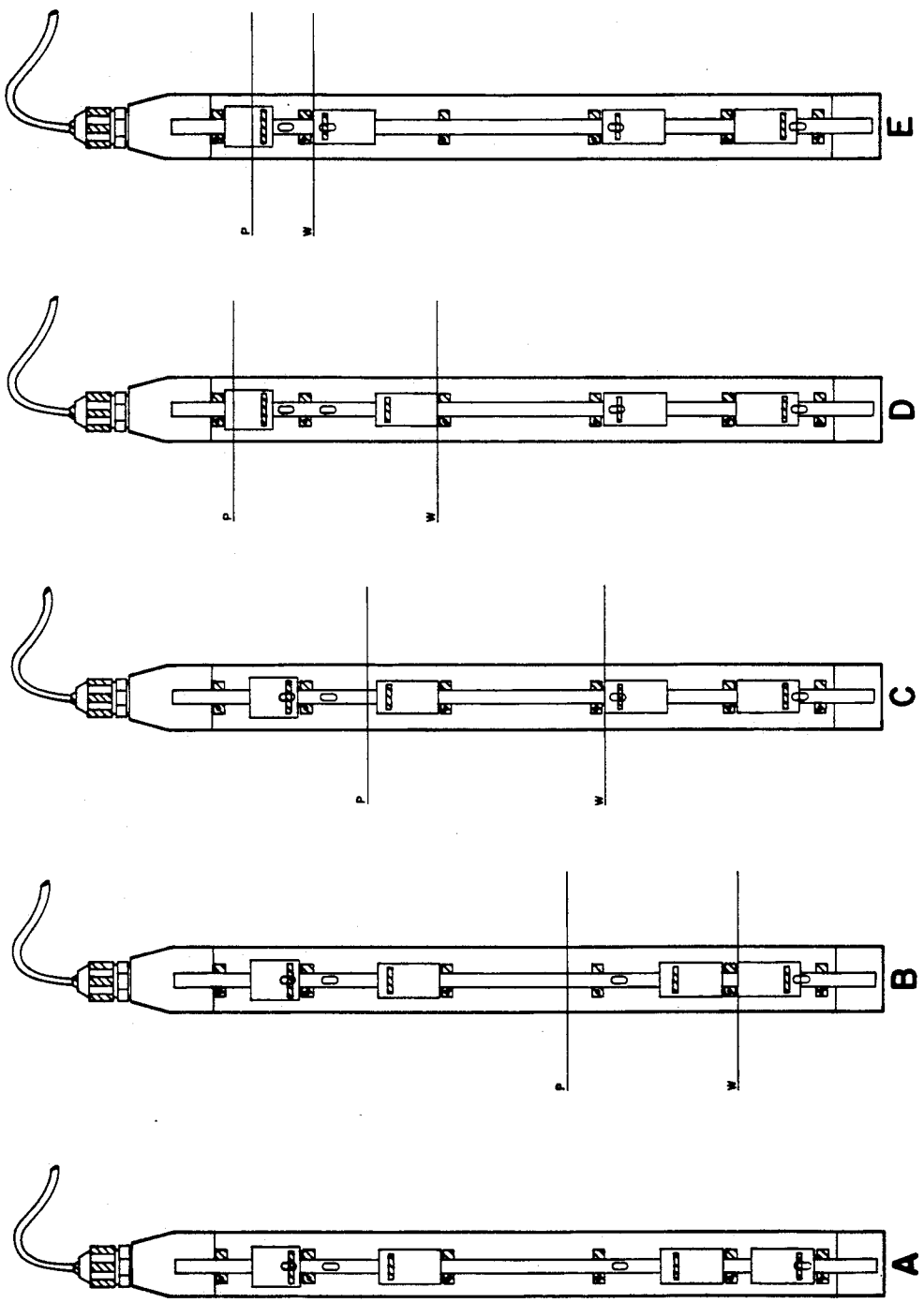
FIG. 5 is a cross sectional view of the sensing probe showing the positions of the floats at five distinct times as the water and pollutant levels rise.

FIG. 5(A) shows the probe suspended in the well before any liquid rising from below comes in contact with the probe. All the floats are down, and neither the pollutant nor the water pump motor is turned on. In 5(B), the top of the pollutant layer is indicated by P, and the top of the water (or water/pollutant interface) is indicated by W. The override float is up, but not pump motors are turned on. The low water float is not raised by the pollutant. In 5(C), the thickness of the pollutant layer has increased and the water has risen sufficiently to raise the low water float. The high water float is within the pollutant layer but has not risen. No pump motors are turned on. In 5(D), the water level has risen but has not yet raised the high water float. The panel water light flashes to indicate the low water float is up. The pollutant level is now high enough to raise the pollutant float, and the pollutant pump motor is turned on and withdraws pollutant from the pollutant layer. By 5(E), the water has risen in the well sufficiently to raise the high water float. While the pollutant layer still raises the pollutant float, the presence of water near the pollutant intake (high water float engages its sensor located just under the pollutant intake level) requires that the pollutant pump motor now be shut off to avoid drawing water into the pollutant pump, and the water pump motor is now turned on to lower the water level in the cone of depression. In 5(E) the thickness of the pollutant layer has been decreased by previous pollutant removal by the pollutant pump.

Figure 6:
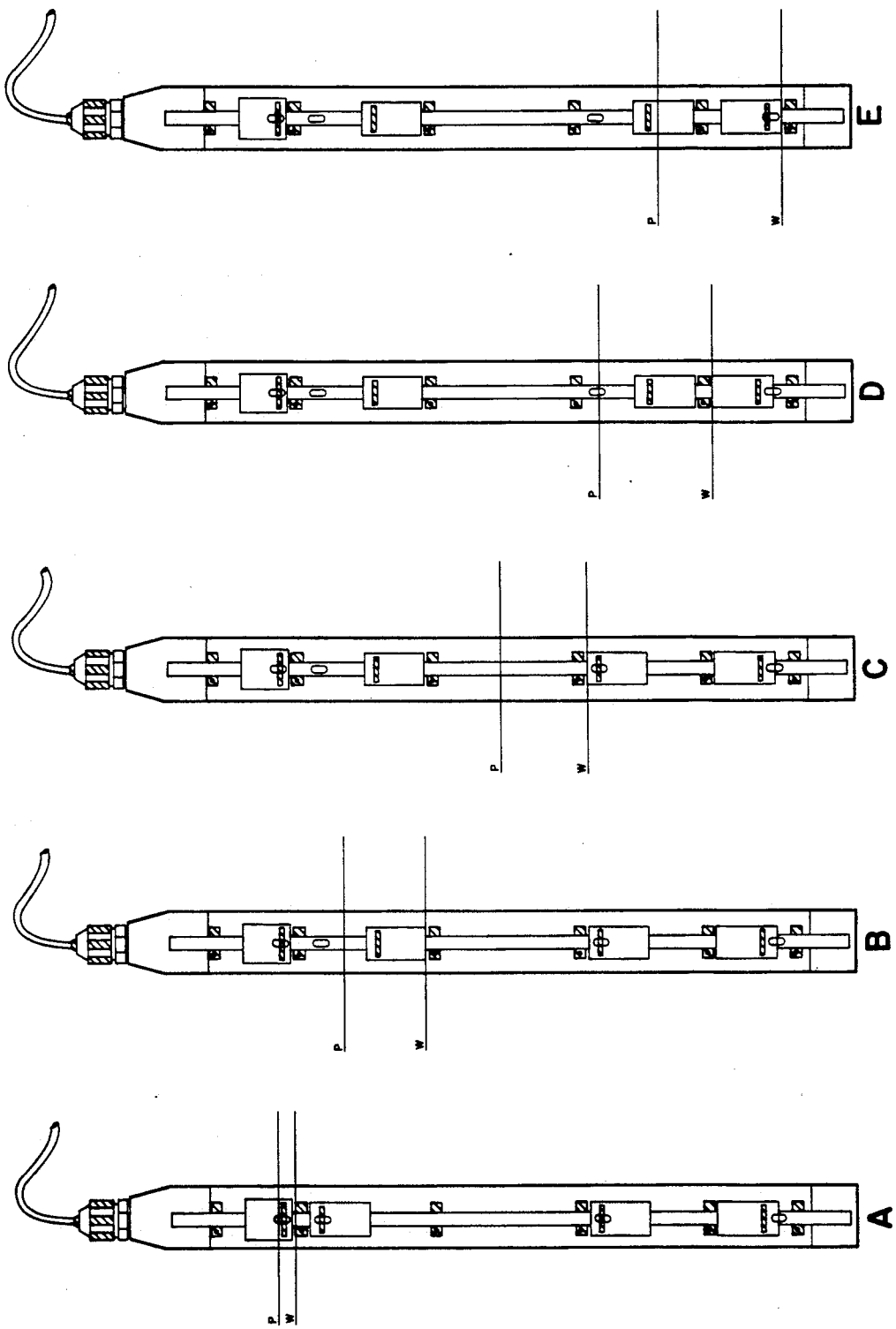
FIG. 6 is a cross sectional view of the sensing probe showing the positions of the floats at five distinct times as the water and pollutant levels fall.

The control sequence as the water level falls is illustrated in FIG. 6. In 6(A) the water level is high and still floats the high water float. However, the pollutant level has been decreased by previous action of the pollutant pump so that the pollutant float is down. The pollutant pump motor is turned off and the water pump motor is turned on since the high water float is up. By 6(B) the pollutant layer has begun to thicken, and the water has fallen sufficiently under the action of the water pump to lower the high water float. However, the water pump motor is still on to continue to lower the cone of depression. By 6(C) the water level still raises the low water float, and the water pump motor is still turned on. By 5(D), the water has fallen and lowered the low water float. At this point, the water pump motor is turned off. In 5(E), the water has fallen sufficiently to drop even the override float.

The function of the override float is that of redundant backup. If, for some reason, the low water float fails to lower, thus prompting the shut off of the water pump motor, the lowered override sensor shuts the water pump motor down. In this manner the cone of depression is never driven below the level of the base of the probe where the override float is located. Conversely, this also means that by raising or lowering the sensing probe, the location of the apex of the cone of depression can be moved. Changing the level of the cone of depression is frequently necessary in response to changing hydraulic conditions in the well. This easy movement of the sensing probe is made possible by the extendable coiled pollutant intake hose and fixed geometry of the pumps. The quick and convenient resetting of the cone of depression level by adjustment of the movable sensing probe on the end of the extendable coiled intake hose is a major feature of the present invention.

For purposes of this specification, the override float is "up" when it no longer activates its associated switch and is "down" when it activates its associated switch; the low water float is "up" when it activates its associated switch and is "down" when it does not activate its associated switch; the high water float is "up" when it activates its associated switch and is "down" when it does not activate its associated switch; and the pollutant float is "up" when it does not activate its associated switch and is "down" when it activates its associated switch.

The operation of the system is not symmetrical with respect to the rising and falling water. The water pump motor is not turned on until the high water float is up, yet is not turned off when the high water float drops, but is only turned off when the low water float or the override float also drops. Further, the pollutant pump motor will always be turned on when the pollutant float is up except when the high water float is also up. Thus, almost continuous pumping of the pollutant layer is achieved. The conditions outlined above are indicated in the following table as are, by way of further example, the conditions of high pollutant layer with no water contacting the sensing probe and an anomolous situation with the override float down but the low water float up:

| FIG. | FLOAT POSITIONS | | | | PUMPS | |
|---|---|---|---|---|---|---|
| | OVR | LO | HI | POL | POL | WATER |
| 5(A) | down | down | down | down | off | off |
| 5(B) | up | down | down | down | off | off |
| 5(C) | up | up | down | down | off | off |
| 5(D) | up | up | down | up | on | off |
| 5(E) | up | up | up | up | off | on |
| 6(A) | up | up | up | down | off | on |
| 6(B) | up | up | down | down | off | on |
| 6(C) | up | up | down | down | off | on |
| 6(D) | up | down | down | down | off | off |
| 6(E) | down | down | down | down | off | off |
| hi pol. | down | down | down | up | on | off |
| lo water | down | (up-err) | down | down | off | off |

FLOATS:
OVR = Override Float;
LO = Low Water Float;
HI = High Water Float;
POL = Pollutant Float
PUMPS:
POL = Pollutant Pump;
WATER = Water Pump In the case where the override float has dropped and stayed down for more than five seconds as in 6(E), an override light shows on the panel and the system will not let the water pump motor come back on until the reset switch (CPU power interrupt switch mentioned earlier) on the control unit panel has been depressed. This requirement for human intervention is built into the system since water level should never fall below the level of the low water float unless there has been some serious malfunction of the system. In addition, several delays are built into the software and can be increased by front panel switches to prevent too rapid a restart of the water pump motor after shut down to avoid large surge currents. Similar delays are built into the software and can be increased by front panel switches to prevent premature start up or too rapid cycling of the pollutant pump motor. The status of the motors can be constantly monitored by appropriate instrumentation on the control unit panel.

The chart above does not show the response of the control program to the position of the float switch in the pollutant recovery tank. If the pollutant level nears the top of the pollutant recovery tank, the pollutant float switch in the tank is activated and the control program will not turn on the pollutant pump motor no matter what the condition of the sensors in the probe. However, since it is important to maintain the cone of depression once it is established, the system controls the water level in the well according to the information provided by the sensing probe even when the pollutant recovery tank is full.

There are other possbile combinations of float positions which may occur due to the failure of a float to rise or fall properly, and the system's response to each can be clearly ascertained by a detailed examination of the program flowchart/logic. In addition a detailed examination of the program flowchart/logic will disclose the remaining system responses and outputs with respect to status lights, timing sequences, and override sequences.

It can be seen that the operation of the recovery system of this invention is neither dependent on mounting both the water pump and its motor and the pollutant pump and its motor on a single support means nor dependent on the sensing probe being attached by a glide to the pump and motor support means. In principle, the water pump and motor, the pollutant pump and motor, and the sensing probe may all be separately supported in the well without limiting the scope of this invention.

The system as described maintains a cone of depression with its lowest level at the bottom of the sensing probe. Using high and low water sensors, the system allows a small modulation of the depth of the cone over the length of the sensing probe. Pollutant is removed from the water table and is pumped only when the pollutant sensor indicates its presence. There is no possibility of water being taken into the pollutant pump. In this manner, water free pollutant is recovered from the contaminated groundwater.

DESCRIPTION OF SOFTWARE PROGRAM

A brief description and overview of the software program is provided to facilitate a rapid understanding of the control program. However, this written description is not intended to be complete in every detail. A complete disclosure of all the details of the program is given by the program flowsheets in FIGS. 8 through 14.

Since the purpose of the program is to switch the pump motors on or off according to the relative positions of the sensing floats housed in the probe, and since the relative float positions change frequently, the logical structure of the program is built around the following general principles:

1. The program sections are designed in loops; that is, the sections cycle back on themselves.
2. Within each loop, the program updates the current status of the sensing switches which reflect the float positions within the probe.
3. Within each loop, the program tests the status of the override sensing switch.
4. Within each loop, the sensing switch status (float positions) necessary to enter that loop are constanty tested to see if all the criteria necessary for the program to remain in the loop still exist.

5. If all necessary conditions to remain in a loop are not present, the program leaves the loop and ultimately reenters the main program near the beginning so that all the logical combinations and pathways generated by the various float positions are tested again before another loop is entered.

In this manner, the program responds immediately to any change in switch status (float position) and achieves a high degree of reliability.

For purposes of ease in following the program as it is presented in the accompanying figures, this written description will generally discuss the program elements which appear in each figure before going on to the program elements in the next figure. The program, of course, is a continuous entity and has only been broken down into seven figures to accomodate the size restrictions of the paper. In the figures, for convenience pollutant has been indicated as "oil", but it should be understood that no limitation is placed on the type of pollutant by this convenience designation. Also, in several places increments of time are shown counted in ten second intervals. The use of ten seconds is for demonstration only and it is to be understood that any intervals could be used without limiting the scope of the program.

Figure 8:
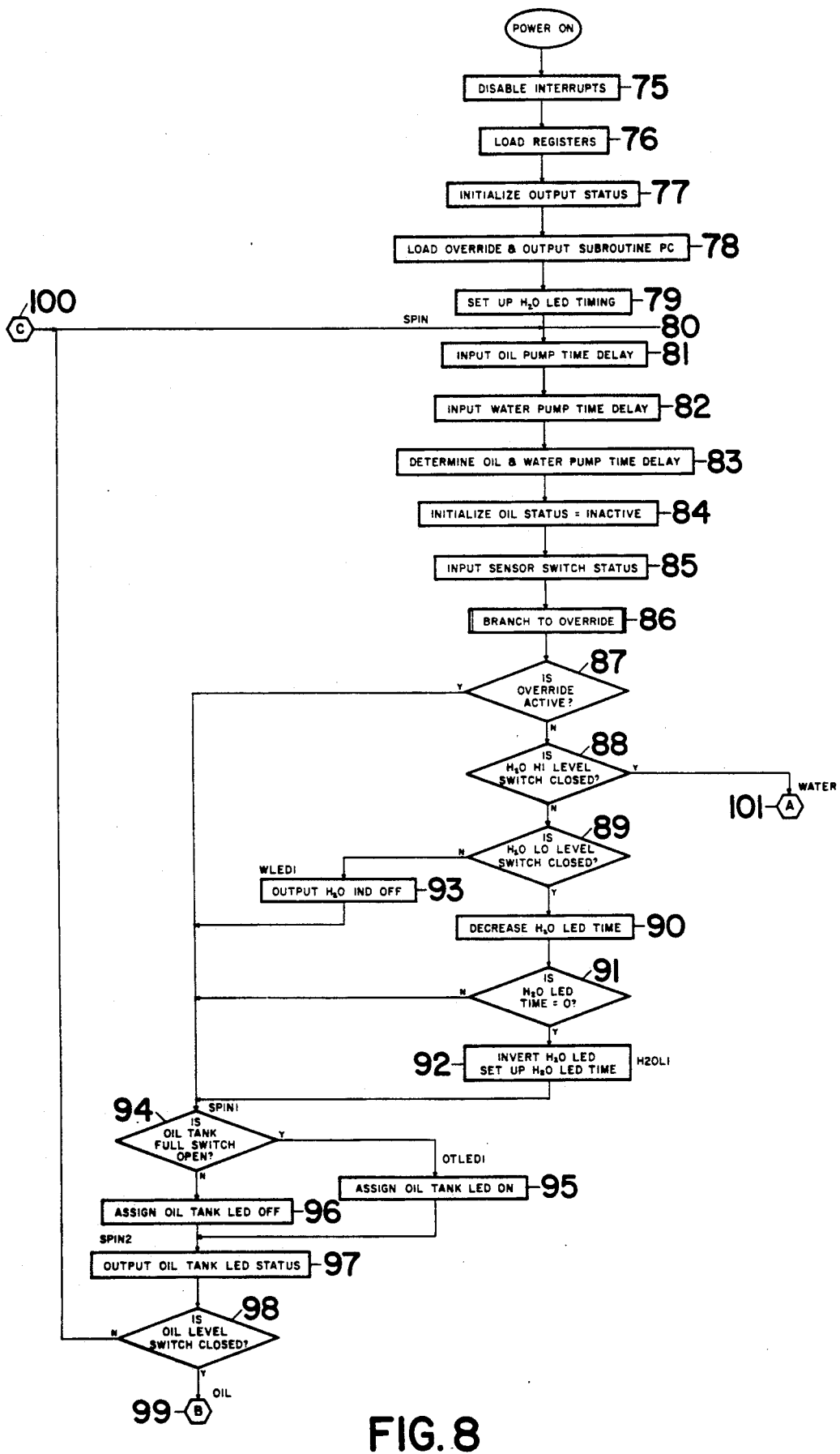
FIGS. 8, 9, 10, 11, 12, 13, and 14 show the logic flow diagrams for the software program which implements the recovery routine of the invention and governs the response of the system and which is contained in the ROM of the microprossor based control unit.
Figure 9:
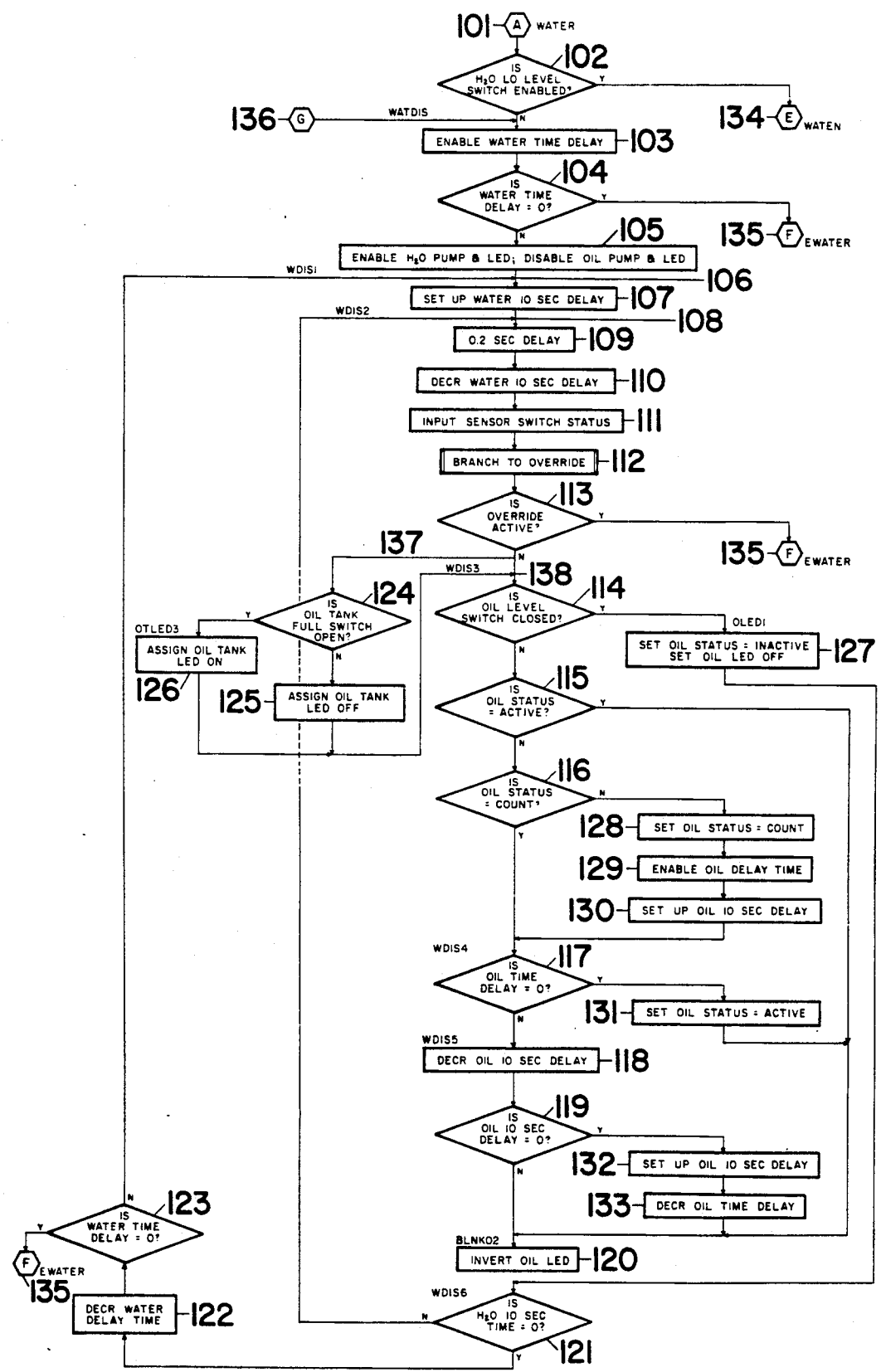

Referring now to FIG. 8, the program begins after power up with a series of routine initialization steps: interupts are disabled at 75, registers are assigned values at 76, the output status register is cleared at 77, the override and output subroutines are loaded at 78, and timing for the water panel lights are set at 78. The oil pump and water pump time delays set on the front panel switches are read at 81 and 82 and placed in memory at 83, and the oil status is set to "inactive" at 84.

At 80 is the entry point for the major recycling loop of the program. As shall be seen, whenever the running condition (on or off) of one of the pumps has been changed, the program cycles back through "C", 100, to this point in order to reevaluate the condition of the entire system. The float positions, as indicated by the sensing switches, are input at 85, and immediately the program branches 86 to the override subroutine. Since this is the first time the branch to the override subroutine appears, its functioning will be described now.

Referring to FIG. 14B, the override subroutine, 228, is entered at 229, and the override status is tested at 230. If the override status is already "active", indicating that the subroutine has been previously implemented and the override float is down, the override routine exits at 237 back to the program location from which it was called. If the override status is not "active", the position of the override float is tested at 231. If the override float is up (switch open), the routine exits at 237 and leaves the override status "inactive". If the float is down (switch closed), the program delays further execution for 5 seconds at 232. The delay at 232 is built in to anticipate hydraulic variations which are known to occur which may temporarily move the override float down without a true permanent drop in the water level. The sensing switch status (float positions) are next updated at 233. At 234 the override switch is again tested, and if the switch is open (float up), the subroutine exits at 237. If the switch is closed (float down), the override status is assigned "active" at 235, the override panel light is turned on at 236 and the subroutine exits at 237 returning to the program location from which it was called.

Referring back to FIG. 8, the branch to override returns at 86 and the status of the override is immediately tested at at 87. If the override status is "active" (override float down), the program proceeds to test the oil tank switch at 94. If the oil switch is open (tank full), the panel oil full light status is assigned "on" at 95. If the oil switch is closed (tank not full), the oil panel light status is assigned "off" at 96. The oil panel light is either turned "on" or "off" at 97. The program next tests the oil float position at 98. If the oil level switch is closed (float up), the program proceeds to "B", 99, which will lead to a determination of whether the oil recovery pump motor will be turned on. If the oil level switch is open (float down), the program recycles at 80.

If the override status at 87 is not "active" (override float up), the program tests at 88 the water high level switch. If the switch is closed (float up), the program enters "A", 101, which will lead to a determination of whether the water pump motor will be turned on. If the water high level switch is open (float down), the water low level switch is tested at 89. If the low level switch is open (float down), the panel water light is turned off at 93, and the program proceeds at 94 as described above. If the water low level switch is closed 89 (float up), the front panel water light will be flashed as long as the low water float is up and the water high level float is down.

The flashing is achieved by a timing technique utilized in several places in the program both to flash panel lights and to count time. The key to understanding the technique is to realize that the microprocessor running the program executes the program commands at a very fast rate, typically millions of times per second. Thus, the real time to perform all the steps and logic functions in one program loop is measured in fractions of a second. By setting up a counter which is decremented each time the program cycles through the loop and by making some event dependent on the counter value reaching zero, it is possible to regulate the periodicity of the event. For example, with the computer cycling one thousand times a second, decrementing the value of one thousand will yield an output once a second (counter equal to zero).

At 90, the value set at 79 for water light timing which allows the eye to effectively see a flash is decreased. If, at 91, the water time set at 79 is not equal to zero, the program proceeds at 94 as described above. If the water time has been decremented to zero, the status (on or off) of the panel light is inverted and the counting value restored at 92. The program again proceeds at 94 as described above.

Referring to FIG. 2, the program enters at "A", 101, after a determination that the water high level float is up. The program steps in FIG. 2 implement the alternative control of the water pump motor which does not use the low water float. At 102 the determination is made whether the switch connecting the low water float is enabled. If the switch is enabled, the low water float is used and the program proceeds at "E", 134, to determine whether the water pump motor should be turned on using all four floats. If the switch is not enabled, the program turns the water pump motor on for a predetermined time whether or not the low water float is down. The water pump motor "on" time is set with a control panel switch input at 82 and the program enables the time at 103. If the delay equals zero (a delay has not been set on the control panel), 104 directs the program to "F", 135, to turn the water pump motor off. If a delay was set, the water pump motor is turned on, the water panel light is turned on, and the oil pump motor and oil pump panel light turned off at 105. Next, two timing loops are used and implimented in the manner outlined above. The first loop from 108 through 121 times ten second intervals. The second loop from 121 through 106 counts the number of ten second intervals which have occured. For the first loop, at 107 the values necessary to establish a ten second delay are set up and following at 109 a two tenths second delay is interposed which by comparison to the rate at which the microprocessor steps through the cycle represents the majority of the time on each cycle. The ten second delay time is decremented at 110 and the delay equal zero condition is tested at 121. If the delay equals zero, the program proceeds to 122. If the delay does not equal zero, the program cycles through the loop again via 108. For every time ten seconds are counted, the program passes to 122 which decrements the overall delay time input from the panel switch at 82 and enabled at 103. If the overall delay has been counted down (water delay equal zero) at 123, the program proceeds to "F", 135, to turn off the water pump motor. If the water delay has not yet been decremented to zero, 123 returns via 106 to the ten second counting loop.

While the water pump motor is on from 105, during each pass through the timing loops the program tests for the condition of the override and oil floats. At 111 the status of the sensing switches is updated and the branch to override at 112 sets the override status. If 113 determines that the override status is "active" (override float down), the program proceeds to "F", 135, to turn the water pump motor off. If the override is "inactive", the remaining steps in the timing loop deal with the condition of the pollutant sensor. In particular, if sufficient oil is present to raise the oil float, the steps are designed first, to delay any start of the oil pump motor until at least ten seconds after the water pump motor is shut down, and second, to flash the oil panel light if the oil float is up.

Thus, 114 tests the condition of the oil level switch. If the oil float is down (switch open), oil status is set "inactive" at 127 and the oil panel light turned off. The program then reenters the timing loop before 121. If at 114 the oil level switch is closed (float up), 115 tests for the oil status. If the status is "active", the program proceeds to invert the condition of the oil panel light at 120 and then proceed to 121 as above. If at 115 the oil status is "inactive" 116 tests to see if the oil status is in a condition called "count". If it is not, oil status is set to count at 128, the delay time set on the front panel oil delay switch is enalbled at 129, and a ten second oil delay counter is set up at 130. If the oil status at 116 equals count or the program comes from 130, 117 tests to see if the oil time delay set on the panel switch was set to zero or has been decremented to zero. If the delay equals zero, oil status is set to "active" at 131, the panel light is inverted at 120, and the timing loop continued. If the panel oil delay at 117 is not zero, the ten second counter value is decremented at 118 and 119 tests to see if the ten second delay set up at 130 is yet equal to zero. If the ten second delay equals zero, the values for the ten second delay are set up again at 132, the panel set oil time delay enabled at 129 is decremented at 133, the panel light is inverted at 120, and the timing loop continues at 121. If at 119 the ten second delay does not equal zero, the panel lamp is inverted at 120, and the timing loop continues at 121. The net effect of these program steps utilizing the oil status indicator is to introduce a minimum ten second delay after the water pump motor is turned off before the oil pump motor can be turned on. The program also recognizes a longer delay if one has been set on the front panel. The oil panel light will blink as long as the oil status is "active".

At 137 the program branches to test the level of oil in the recovery tank. If at 124 the switch is open (float up), the oil full light is turned "on" at 126, and the branch returns to the timing loop at 138. If at 124 the tank switch is not open (float down), the oil full light is turned "off" at 125 and the branch returns at 138. The above described timing sequence for running the water pump motor for a preset time can also be accessed by a later point in the program through "G", 136.

Figure 10:
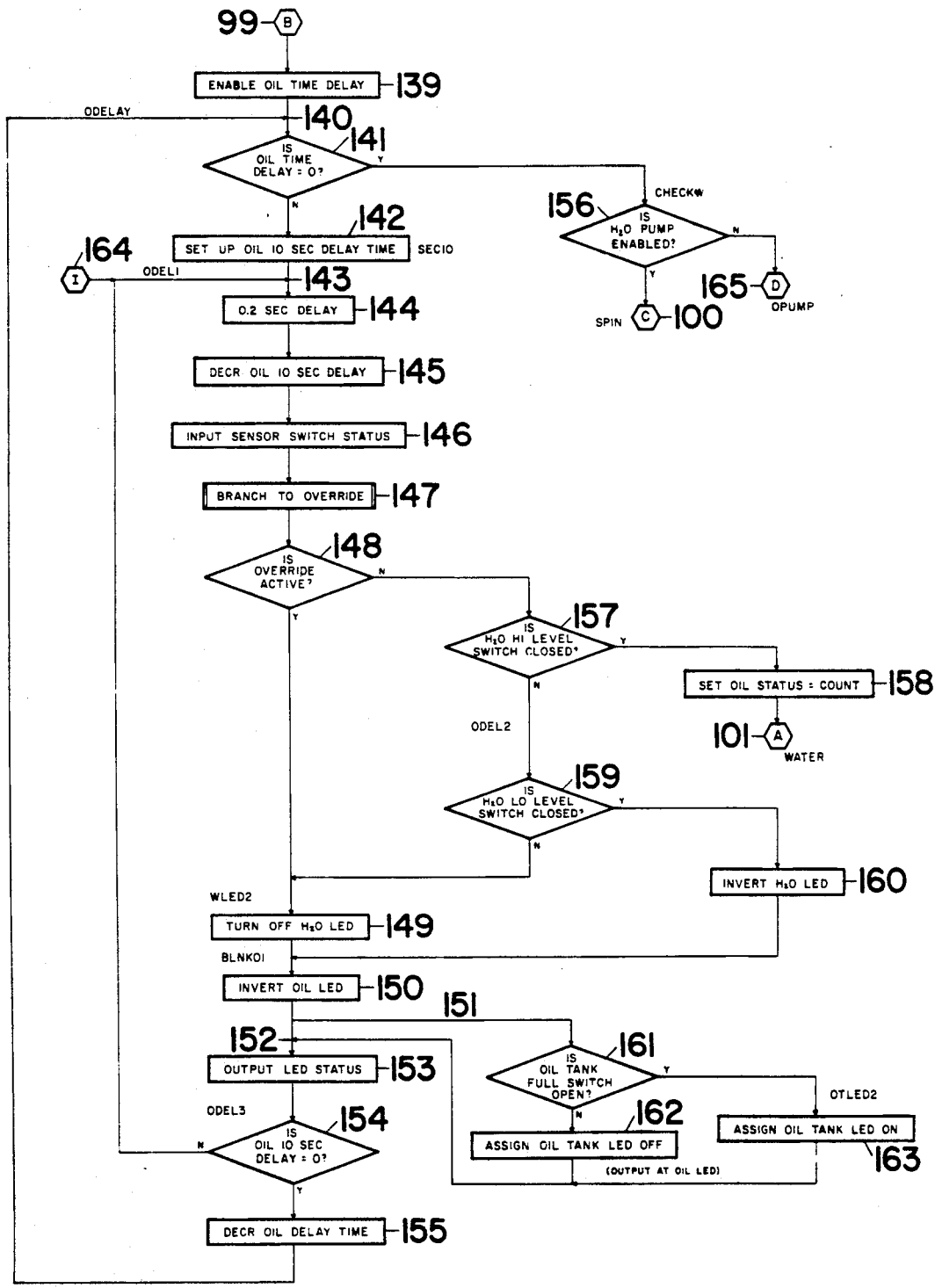

Referring now to FIG. 10 the initial program sequence leading to oil pump motor activation is shown. Again a timing loop from 141 through 155 to 140 is used to count units of time in seconds. Within the loop, the condition of the water high level float is constantly tested to insure that the oil pump motor is never turned on when the high water float is up.

Entering at "B", 99, the program immediately enables the oil delay time set by the panel switch. The delay is tested at 141, and if no delay was set or if the delay time has elapsed (delay time equals zero), the program tests at 156 to see if the water pump motor is on. If the water pump motor should be on, the program cycles back to "C", 100, at the beginning of the program. If the water pump motor is off, the oil pump activation routine "D", 165, is entered. If, at 141, the delay time does not equal zero, the program sets up a ten second counter at 142. A short delay at 144, is followed by the usual decrement of the ten second timer/counter at 145. During each pass through the loop the status of the oil panel light is inverted at 150, and the status output at 153. Thus, as long as the oil float is up and the oil pump motor is not on, the oil panel light will blink. The ten second loop counter is tested at 154, and if the delay is not equal to zero, indicating that ten seconds have not yet elapsed, the loop cycles back to 143. If at 154 the delay equals zero, the panel set oil pump delay time is decremented at 155.

Within the timing loop, the water level floats are monitored. The sensor status is updated at 146 followed by the usual brach to override at 147. If at 148 the override float is down (override "active"), the water panel light is turned off at 149, and the program continues as described earlier. If the override float is up (override "inactive") at 148, 157 tests the position of the water high level float. If the high water float is up (switch closed), 158 sets oil status to "count", and the program returns to the initial water pump motor activation sequence at "A", 101. If the water high level float is down at 157, 159 tests the low water float. If the low water float is up (switch closed), the status of the water panel light is inverted at 160 and the program reenters the timing loop. The status of the water panel light is also output at 153. Thus, as long as the low water float is up and the high water float is down, the water panel light will blink. If, at 159, the low water float is down (switch open), the program reenters the timing loop and continues as described earlier.

At 151 along the timing loop, the status of the panel oil recovery tank full light is updated at 161 and either 162 or 163 by the same sequence as described previously before returning to the timing loop at 152. Finally, the timing loop can also be entered from "I", 164, at 143.

Figure 11:
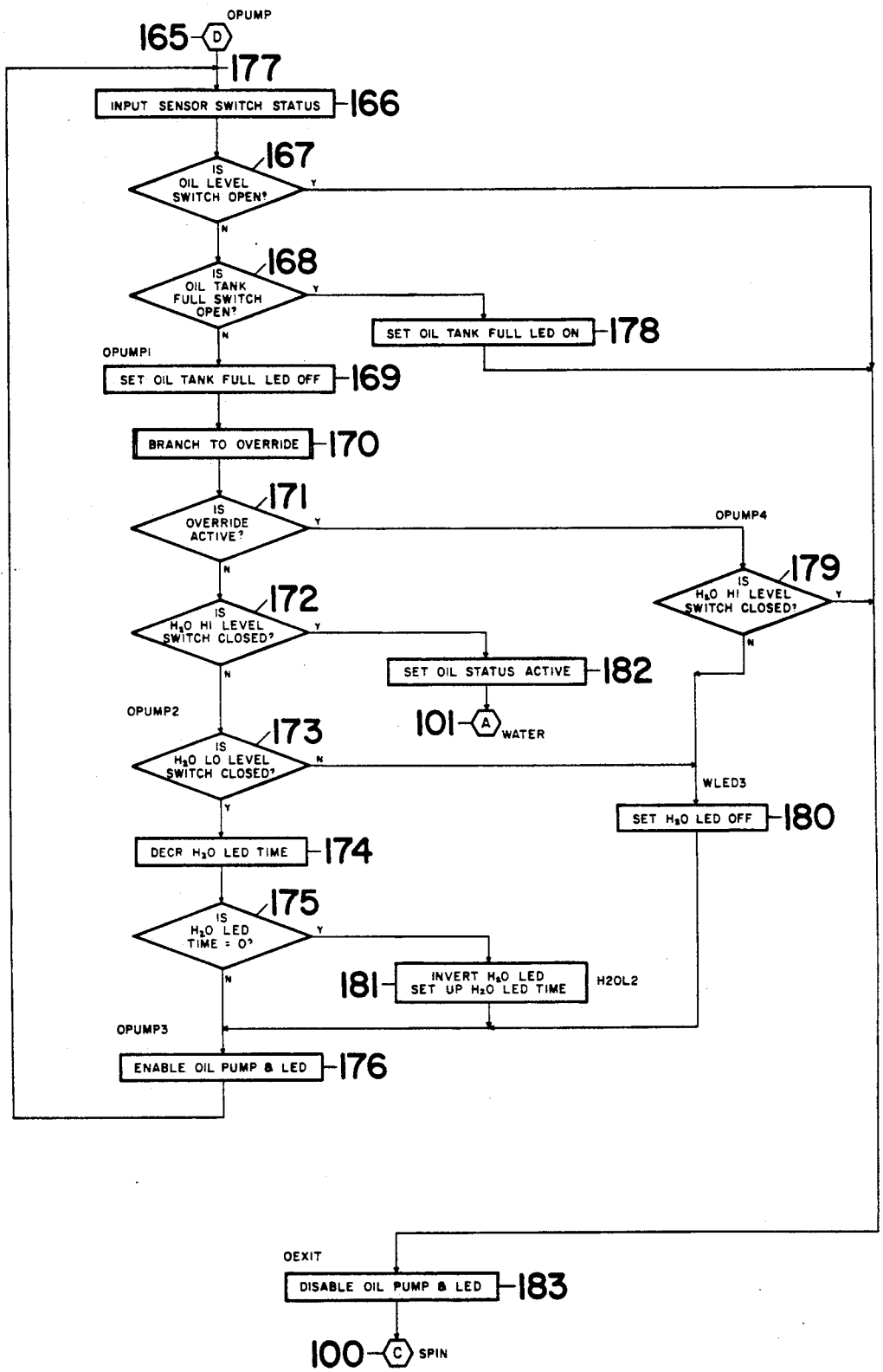

Referring now to FIG. 11, the routine which turns on the oil pump motor is shown. The oil pump motor enable routine consists of a loop within which are tested the conditions necessary to turn the oil pump motor on and keep it on. By placing tests for these conditions in a loop enabling the pump motor, the system continually verifies that the pump motor should remain on. If the oil sensing float is not up, if the water high level float is up, or if the recovery tank is full, the program will not turn on the oil pump motor. As mentioned earlier, the oil pump motor will run to remove oil even if the water pump override is activated as long as one or more of the above three conditions are not met.

Entering at "D", 165, the program immediately inputs the status of all the float switches at 166. If, at 167, the oil float is down (switch open), the program disables the oil pump motor if it was on at 183 and reenters the beginning of the program through "C", 100. If, at 167, the oil float is up (switch closed), the condition of the oil tank is tested at 168. If the tank float is up (switch open), the program disables the pump motor if it was on at 183, and reenters the beginning of the program through "C", 100. If the tank float is down (switch closed) at 168, the panel oil tank full light is turned off at 169, and the program branches to the override routine at 170. If the override float is down (override "active") at 171, the program again tests the water high level float at 179. If the water high level float is up at 179, the program disables the pump motor if it was on at 183, and reenters the beginning of the program through "C", 100. If the water high level float is down at 179 (switch open), the water panel light is turned off at 180, and the program reenters the enabling loop.

If the override float is up (override "inactive") at 171, the water high level float is again tested at 172. If the water high level float is up (switch closed), the oil status is set "active" at 182, and the oil pump motor enabling routine is left and the water pump motor activation routine is entered at "A", 101. If the water high level float is down (switch open) at 172, the program tests the position of the water low level float at 173. If the water low level float is down (switch open), the panel water light is turned off at 180, and the program reenters the enabling loop. If, at 173, the water low level float is up (switch closed), the water light timing counter (which controls the blink rate of the light) is decremented at 174. If the water panel light counter has been decremented to zero at 175, the light status is inverted and the counter set up again at 181. The program then reenters the enabling loop. If the water panel light counter is not equal to zero at 175, the program turns on the oil pump motor and the oil pump panel light at 176. Once the oil pump motor is on, the entire sequence is repeated through the loop return at 177.

Figure 12:
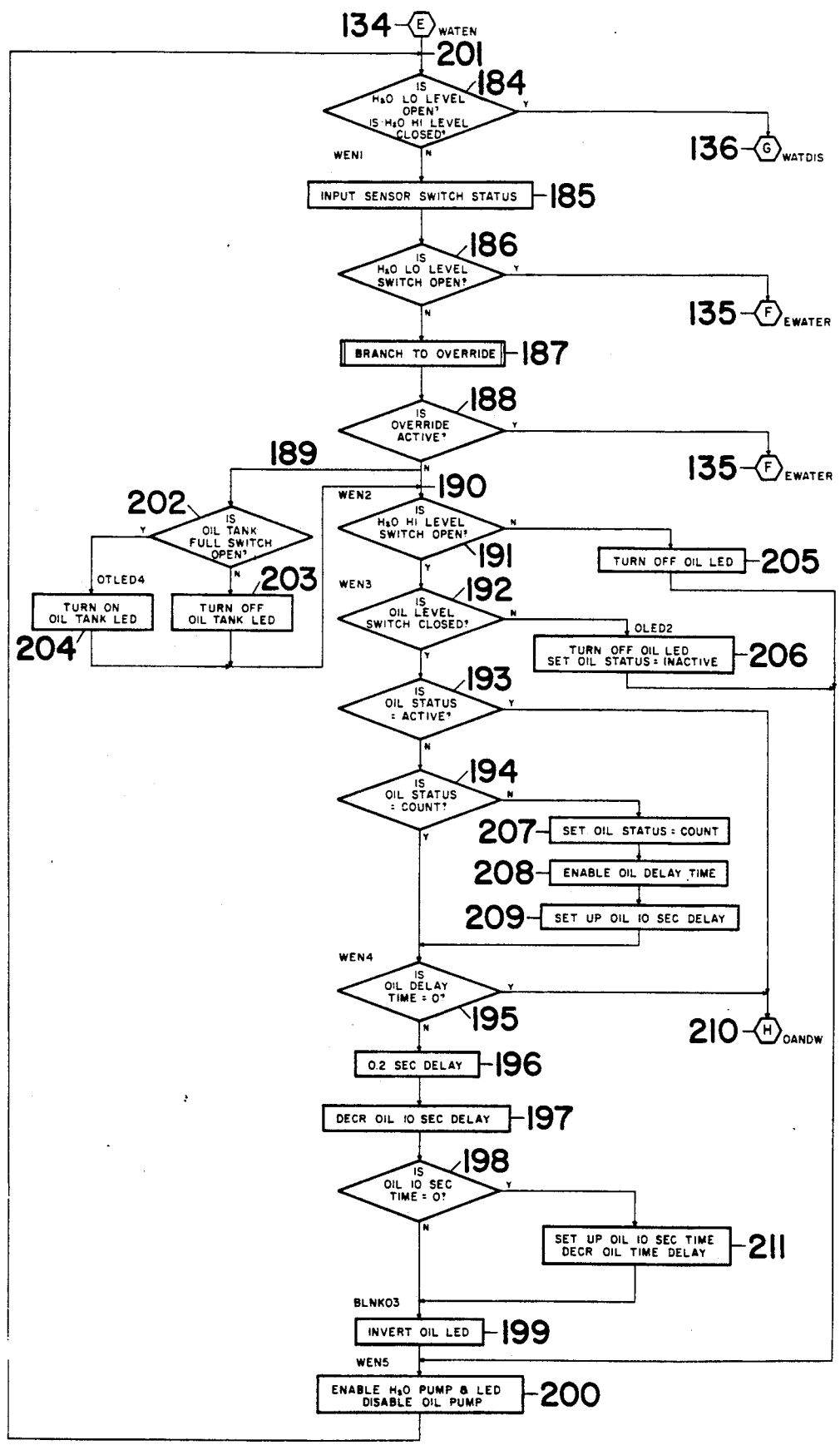

Referring now to FIG. 12, the routine which turns on the water pump motor is shown. As mentioned earlier, while the water pump motor is activated by the water high level float rising to the up position, the water pump motor is not turned off when the water high level float falls, but rather is turned off only when the water low level float or the override float is down. The routine in FIG. 12 implements this behavior. Like the design of the oil pump motor routine, the water pump motor enabling routine is looped with the necessary conditions for continued water pumping being tested within the loop. Also within the loop is a test for the anamolous condition of the water low float down while the water high float is up. Finally, the loop is designed to keep the water pump motor on for a minimum time while the oil delay time is counted down.

After entering the routine at 134, the program tests at 184 for the anomaly of the water high level float being up (switch closed) while the water low level float is down (switch open). If the anomaly exists, the program enters the timed loop through "G", 136.

If the anomalous condition does not exist, the sensor status is input at 185 and the position of the water low level float is tested at 186. If the water low level float is down (switch open), the program enters the water pump motor shut down routine through "F", 135. If the water low level float is up (switch closed) the program branches to the override routine at 187 and tests the override status at 188. If the override is "active" (override float down), the program enters the water pump motor shut down routine through "F", 135. If the override is "inactive" (override float up), the status of the water high level float is again tested at 191. If the water high level float is up (switch closed), the panel oil light is turned off at 205 and the program reenters the loop before 200. The water pump motor and panel water light are turned on and the oil pump motor turned off, if necessary, at 200. The program then cycles back and completes the loop at 201.

If, at 191, the water high level float is down (switch open), the program proceeds to test the status of the oil level float at 192. If the oil float is down (switch open), the panel oil light is turned off and the oil status set to "inactive" at 206. Again the program reenters the loop before 200 and proceeds to turn the water pump motor on and loop back. The remaining program elements in the loop determine when the oil pump motor will be turned on.

As long as the water high level float is not up (switch closed), the oil pump motor can be activated. However, because rapid fluctuations may occur in the well liquid levels prematurely raising the oil float, the program provides for a delay between the oil float rising and the simultaneous activation of the oil and water pump motors. The delay is set by the panel oil delay switch. Thus, if the oil level float is up (switch closed) at 192, a test for the oil status is done at 193. If the status was set "active" elsewhere in the program, the program proceeds to the oil and water pump motor turn on routine through "H", 210. If the oil status at 193 is not "active", 194 checks to see if the oil status is set to "count". If the oil status is not set to "count" at 194, 207 sets the oil status to "count". At 208 the oil time delay set on the front panel is enabled, and at 209 the internal time delay counter is set up. The program reenters the loop and proceeds to 195. If, at 194, the oil status was already equal to "count", the delay set by the panel switch is tested at 195. If the delay counter has already been decremented to zero or if no delay was set on the panel, the program proceeds to the oil and water pump motor turn on routine through "H", 210. If the delay set by the panel switch is not equal to zero, a timing/counting sequence is used similar to those seen earlier. A short delay is introduced at 196 and the internal ten second delay counter is decremented at 197. At 198 the ten second counter is tested to see if it equals zero. If the oil 10 second delay equals zero at 198, is reestablished at 211 and also at 211 the panel delay is decremented. The program then reenters the loop. In this manner, the front panel delay time is decremented in ten second intervals. As mentioned earler, the value of ten seconds is shown by way of example, and any value may be used without limiting the scope of the invention. If the delay at 198 does not equal zero the loop is continued until ten seconds have passed. At 199 the oil panel light status is inverted on each pass through the loop. The oil panel light will, therefore, blink as long as the oil level float is up and the delay is being timed. The loop will keep the water pump motor on and the oil pump motor off until the delay time has passed and the program goes to "H", 210.

At 189 the status of the panel tank full light is updated in the same manner as seen previously through 202 and either 203 or 204 returning to the loop at 190.

Figure 13:
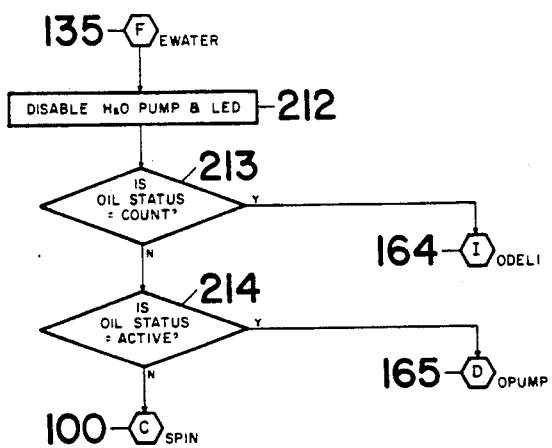
Figure 14:
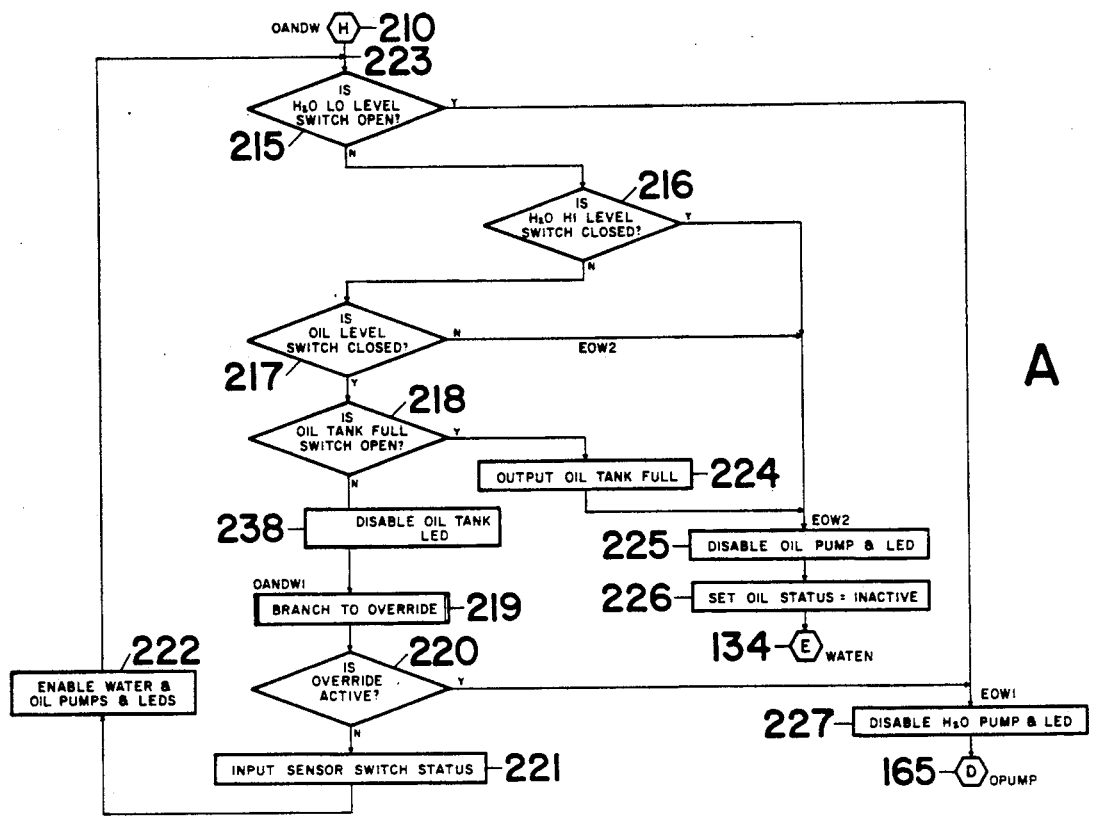
Figure 14:
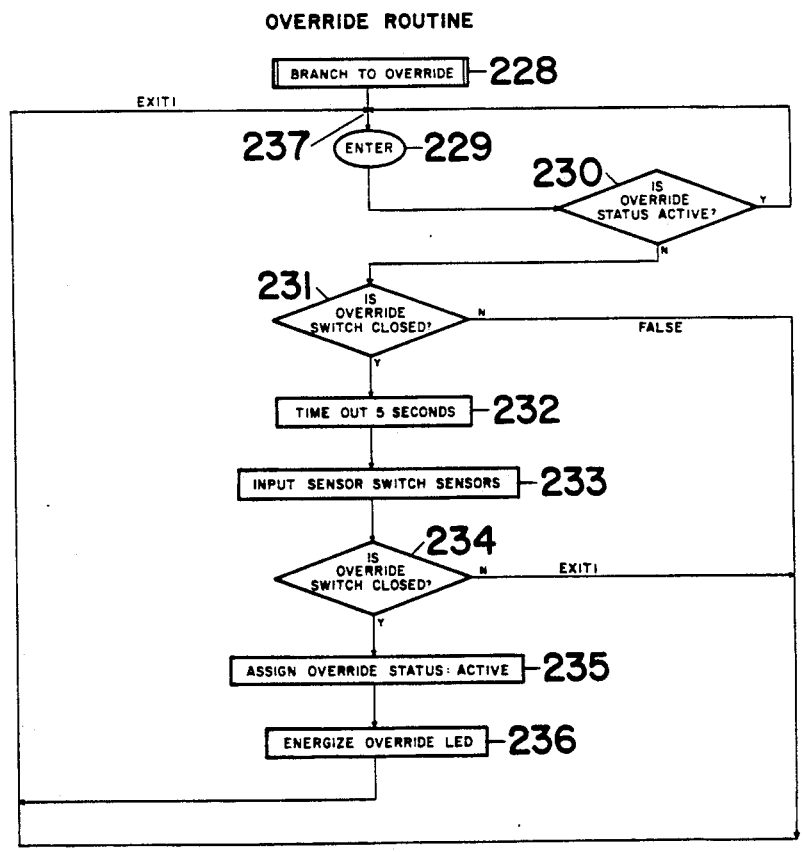

Referring now to FIG. 13, the water pump motor turn off routine is shown. After entering at "F", 135, the water pump motor is immediately turned off at 212. At 213 the oil status is tested. If the oil status is set to "count", the program returns through "I", 164, to the timing loop preceeding the oil pump activation routine. Thus, even though the water pump motor is turned off, the oil pump motor may be turned on after a delay. If, at 213, the oil status is not set to "count", the oil status is tested at 214 to see if it is set to "active". If the oil status is "active", the program enters the oil pump turn on routine without a delay through "D", 165. If, at 214, the oil status is not "active" the program returns to its beginning through "C", 100.

In FIG. 14A is shown the routine which powers both the water and oil pump motors simultaneously. Again a loop is used with all the conditions necessary for both pump motors to be "on" tested within the loop. Any deviation from the necessary conditions turns one or the other pump motors off. After entering at "H", 210, 215 tests for the position of the water low level float. If the water low level float is down (switch open), the water pump motor and water panel light are turned off at 227, and the program enters the oil pump routine through "D", 165. If the water low level float is up (switch closed), at 216 the status of the water high level float is tested. If the water high level float is up (switch closed), the oil pump motor and oil panel light are turned off at 225, the oil status is set to "inactive" at 226, and the program enters the water pump routine through "E", 134.

If, at 216, the water high level float is down (switch open), the position of the oil level float is tested at 217. If the oil float is down (switch open), the oil pump motor is turned off at 225 and the program proceeds as described above. If the oil float is up (switch closed) at 217, the tank full float is tested at 218. If the tank float is up (switch open), the tank full light is turned on at 224, and the oil pump motor and oil panel light turned off at 225. The program then proceeds as described above. If the tank float is down (switch closed) at 218, the program branches to override at 219 and tests the override status at 220. If the override is "active" (override float down), the water pump motor and water panel light are turned off at 227 and the oil pump routine entered through "D", 165. If the override is not active, the status of the sensor switches is updated at 221, and the water and oil pump motors turned on at 222. The water and oil panel lights are also turned on at 222. The program then loops back through 223.

What is claimed is:

1. A groundwater pollutant recovery system for use in conjunction with a porous-walled well drilled to a level substantially below the water table comprising:
   a. a probe responsive to the level of liquids within the well;
   b. an intake means for receiving pollutant attached to the side of said probe;
   c. a pollutant pump fluidly attached to said intake means for receiving pollutant, said pollutant pump located within the water present in the well and, therefore, away from the pollutant in the well;
   d. a water pump;
   e. means for repositioning said probe;
   f. a microprocessor based controller responsive to liquid levels indicated by said probe, said controller controlling the flow of water and pollutant out of the well.

2. A sensing probe comprising:
   a. a means for supporting in a vertical orientation a plurality of liquid level sensors;
   b. a plurality of liquid level sensors dispersed at different heights along the vertical length of the probe; and
   c. intake means for receiving pollutant attached to the side of the probe, said means located substantially at the same level as at least one of said liquid level sensors.

3. A groundwater pollutant recovery system for water immiscible pollutants, utilizing the cone of depression technique, for use in conjunction with a porous walled recovery well drilled below a pollutant site to a level substantially below the static water table, comprising:
   a. a submersible electric motor driven water pump with water inlets in the pump housing;
   b. conduit means attached to the discharge outlet of the water pump for discharging water drawn from the well by the water pump above ground;
   c. suspension means attached to the water pump for locating the water pump substantially below the static water table leveling the well;
   d. an electric motor driven pollutant pump;
   e. conduit means attached to the pollutant pump discharge for discharging pollutant pumped from the well into the recovery tank;
   f. suspension means attached to the pollutant pump for locating the pollutant pump under water substantially below the apex of the cone of depression;
   g. a sensing probe having at least one water level sensor and at least one pollutant level sensor located above at least one water sensor, said sensing probe having attached to its side at the level of the pollutant level sensor a pollutant intake;
   h. suspension means attached to the sensing probe for raising, lowering, and positioning the sensing probed at or below the level of the static water table but above level of the water pump;
   i. a flexible extendable hose connecting the pollutant level intake on the sensing probe to the pollutant intake on the submerged pollutant pump, said hose allowing the distance between the sensing probe and pollutant pump to be increased or decreased;
   j. a system controller means responsive to the liquid level information provided by the sensors in the sensing probe for switching on and off the electric motors which drive the water and pollutant pumps in such manner as to create and maintain the cone of depression in the water level while removing the pollutant layer riding on top of the water;
   k. an electric power cable connecting the water pump motor and the system controller;
   l. an electric power cable connecting the pollutant pump motor and the system controller;

m. an instrumentation cable connecting the liquid level sensors in the sensing probe and the system controller;

n. an instrumentation cable connecting the liquid level sensor in the recovery tank and the system controller.

4. The pollutant recovery system of claim 3 further comprising:

a. a recovery tank for receiving pollutant pumped from the well; and b. a pollutant level sensor fixed in said recovery tank wherein the system controller means is additionally responsive to the liquid level information provided by said sensor in said recovery tank.

5. In a system for pollutant recovery from the groundwater aquifer by selective activation of water and pollutant removal pumps in response to liquid level indicators, a system controller comprising:

a. data receiving means for receiving sensor indications of liquid levels;

b. means responsive to said data receiving means for determining the presence and height of water around the sensing probe;

c. means responsive to said data receiving means for determining the presence of pollutant at the height of the pollutant pump intake on the sensing probe;

d. means responsive to said data receiving means for determining the proximity of water to the pollutant pump intake on the sensing probe;

e. means responsive to said means for determining the presence of water, means for determining the presence of pollutant at the pollutant pump intake, and means for determining the proximity of water to the pollutant pump intake for determining whether either or both of the water and pollutant pump electric motors should be activated or deactivated;

f. means for activating the electric power supply to the water and pollutant pump motors.

6. The system controller of claim 5 further comprising:

a. means responsive to said data receiving means for determining whether the pollutant receiving tank is full; and b. means responsive to said means for determining whether the recovery tank is full for determining whether the pollutant pump electric motor should be activated or deactivated.

7. The system controller of claim 6 further comprising means responsive to said means for determining the presence of water and means for determining whether the recovery tank is full, for turning control panel lights on or off.

8. The system controller of claim 5 further comprising:

a. data receiving means for receiving input of the delays to be used before activating either the water or pollutant pump electric motors; and b. delay means for delaying the activation of the water and pollutant pump electric motors.

9. The system controller of claim 5 further comprising means responsive to said means for determining the presence of water and means for determining the presence of pollutant at the pollutant pump intake for turning the control panel lights on or off.

10. The system controller of claim 5 further comprising:

a. data receiving means for receiving input of whether to use liquid sensor data or a timed routine to control the power to the water pump motor; and b. means for using a timed sequence to control the power to the water pump motor.

11. In a groundwater pollutant recovery system for water immiscible pollutants, utilizing the cone of depression technique, for use in conjunction with a porous walled recovery well drilled below a pollutant site to a level substantially below the static water table, a pollutant pump housing, which is connected to pollutant intake means and pollutant discharge means, for cooling a pollutant pump motor with flowing from a water discharge pump to a substantially upright water discharge conduit comprising:

a. an outer casing which connects the discharge outlet of the water pump to the discharge conduit thereby said outer casing both suspending the electric motor driven water pump and also receiving the discharge water at said outer casing's lower end and passing the discharge water out said outer casing's upper end to the discharge conduit;

b. an inner casing, wherein is contained the electric motor driven pollutant pump, said inner casing mounted to the outer casing so that the discharge water may flow around said inner casing;

c. connection means for connecting pollutant intake means and pollutant discharge means to the outer casing; and d. connection means for passing the pollutant through the outer and inner casings to the intake and discharge ports of the electric motor driven pollutant pump.

12. A groundwater pollutant recovery system for water immiscible pollutants, utilizing the cone of depression technique, for use in conjunction with a porous walled recovery well drilled below a pollutant site to a level substantially below the static water table, comprising:

a. means responsive to the height of water in the well;

b. means responsive to the height of pollutant in the well;

c. means for removing the water from the well;

d. means for removing the pollutant from the well; and e. system controller means responsive to the means responsive to the height of water in the well and to the means responsive to the height of pollutant in the well, said controller means activating and deactivating the means for removing water from the well and means for removing pollutant from the well.

13. A computer-based method of recovering water immiscible pollutants, utilizing the cone of depression technique, for use in conjunction with a porous walled recovery well drilled below a pollutant site to a level substantially below the static water table, comprising the following steps:

a. determining the status of pollutant and water level sensors on a probe suspended in the well;

b. determining whether the status of power to the water and pollutant pumps should be switched so that:

(1) the zone of depression is maintained; and (2) if pollutant is present, there is continuous pumping of pollutant, unless further running of the pollutant pump would result in the pollutant pump pumping water;

c. switching or not switching the status of power to the pumps as required by step b; and d. repeating steps a through d.

14. The method of claim 13 further comprising displaying on a control panel the status of the sensors and the pumps.

15. The method of claim 13 further comprising interrupting the cycle and switching power to the water pump off if an override water sensor is activated so that the cone of depression is never lowered beneath the probe.

16. The method of claim 15 further comprising displaying on a control panel the status of the sensors and the pumps.

17. The method of claim 13 further comprising introducing timing delays between steps b and c.

18. The method of claim 13 further comprising powering the water pump in response to a timed routine rather than the status of the sensors.

19. The method of claim 13 further comprising:

a. determining the status of a high level sensor in a pollutant recovery tank; and b. switching power to the pollutant pump off if the recovery tank is full.

20. The method of claim 19 further comprising displaying on a control panel the status of the sensors and the pumps.

* * * * *